United States Patent
Lee et al.

(10) Patent No.: US 10,659,955 B2
(45) Date of Patent: May 19, 2020

(54) APPARATUS AND METHOD FOR INSTALLING AND MANAGING ESIM PROFILES

(71) Applicant: Samsung Electronics Co., Ltd., Suwon-si, Gyeonggi-do (KR)

(72) Inventors: Hyewon Lee, Seoul (KR); Sujung Kang, Suwon-si (KR); Jonghan Park, Bucheon-si (KR); Kangjin Yoon, Seoul (KR); Duckey Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/825,995

(22) Filed: Nov. 29, 2017

(65) Prior Publication Data

US 2018/0160294 A1  Jun. 7, 2018

(30) Foreign Application Priority Data

Dec. 1, 2016 (KR) .................. 10-2016-0162635
Apr. 26, 2017 (KR) .................. 10-2017-0053945

(51) Int. Cl.
*H04M 1/66* (2006.01)
*H04W 8/18* (2009.01)
(Continued)

(52) U.S. Cl.
CPC ............. *H04W 8/183* (2013.01); *H04W 8/20* (2013.01); *H04W 12/0023* (2019.01); *H04W 12/06* (2013.01); *H04W 12/10* (2013.01)

(58) Field of Classification Search
CPC ............... H04L 63/08; H04L 29/08657; H04L 29/08108; H04W 12/06; H04W 12/08;
(Continued)

(56) References Cited

U.S. PATENT DOCUMENTS

2012/0190354 A1* 7/2012 Merrien .................. H04W 4/70
455/422.1
2012/0260090 A1 10/2012 Hauck et al.
(Continued)

FOREIGN PATENT DOCUMENTS

EP 3340667 * 6/2018 ............ H04W 8/205
EP 3 605 995 A1 2/2020
(Continued)

OTHER PUBLICATIONS

European Search Report dated Mar. 4, 2020; European Appln. No. 17875610.2-1212/3530016 PCT/KR2017013953.

*Primary Examiner* — Khoi H Tran
*Assistant Examiner* — B M M Hannan
(74) *Attorney, Agent, or Firm* — Jefferson IP Law, LLP

(57) ABSTRACT

An apparatus and method for safely providing a profile to a terminal in a communication system are provided. The apparatus and method include a communication technique that combines a fifth generation (5G) communication system for supporting a data rate that is higher than that of a beyond fourth generation (4G) system with Internet of technology (IoT) technology, and a system thereof. The present disclosure may be applied to intelligent services based on 5G communication technology and IoT related technology, such as smart home, smart building, smart city, smart car or connected car, health care, digital education, retail, security and safety related services.

16 Claims, 30 Drawing Sheets

(51) Int. Cl.
*H04W 12/06* (2009.01)
*H04W 12/10* (2009.01)
*H04W 12/00* (2009.01)
*H04W 8/20* (2009.01)

(58) Field of Classification Search
CPC ..... H04W 12/12; H04W 88/02; H04W 8/183; H04W 4/02; H04W 8/18; G06Q 30/02; H04M 2207/18
USPC .......................................................... 455/411
See application file for complete search history.

(56) References Cited

U.S. PATENT DOCUMENTS

| | | | |
|---|---|---|---|
| 2013/0344864 A1* | 12/2013 | Park | H04W 8/18 455/432.3 |
| 2014/0031012 A1 | 1/2014 | Park et al. | |
| 2014/0329502 A1* | 11/2014 | Lee | H04W 12/06 455/411 |
| 2015/0281964 A1* | 10/2015 | Seo | H04L 63/102 726/9 |
| 2015/0303966 A1* | 10/2015 | Lee | H04B 1/3816 455/466 |
| 2015/0349825 A1* | 12/2015 | Lee | H04W 8/205 455/558 |
| 2016/0006728 A1 | 1/2016 | Park et al. | |
| 2016/0283216 A1 | 9/2016 | Gao | |
| 2016/0286380 A1 | 9/2016 | Long | |
| 2016/0301529 A1 | 10/2016 | Park et al. | |
| 2017/0048251 A1* | 2/2017 | Guday | H04W 12/08 |
| 2017/0077975 A1* | 3/2017 | Wang | G06F 15/177 |
| 2017/0156051 A1 | 6/2017 | Park et al. | |
| 2018/0027410 A1* | 1/2018 | Berard | H04W 4/70 380/270 |
| 2019/0053040 A1* | 2/2019 | Long | H04L 63/0876 |
| 2019/0140837 A1* | 5/2019 | Cheng | H04W 8/20 |
| 2019/0364415 A1* | 11/2019 | Gao | H04W 8/20 |

FOREIGN PATENT DOCUMENTS

| | | | |
|---|---|---|---|
| WO | 2016/003178 A1 | 1/2016 | |
| WO | 2016/091414 A1 | 6/2016 | |
| WO | 2016/178548 A1 | 11/2016 | |
| WO | WO2017177383 A1 * | 10/2017 | .............. H04W 8/20 |

* cited by examiner

FIG. 6A

| Profile Download | 0 | |
|---|---|---|
| RPM | 0 | 0 |
| | Profile Download | RPM |

FIG. 6B

| Profile Download | X | |
|---|---|---|
| RPM | X | 0 |
| | Profile Download | RPM |

FIG. 6C

| Profile Download | X | |
|---|---|---|
| RPM | 0 | X |
| | Profile Download | RPM |

FIG. 6D

| Profile Download | X | |
|---|---|---|
| RPM | X | X |
| | Profile Download | RPM |

APPARATUS AND METHOD FOR INSTALLING AND MANAGING ESIM PROFILES

CROSS-REFERENCE TO RELATED APPLICATION(S)

This application claims the benefit under 35 U.S.C. § 119(a) of a Korean patent application filed on Dec. 1, 2016 in the Korean Intellectual Property Office and assigned Serial number 10-2016-0162635, and of a Korean patent application filed on Apr. 26, 2017 in the Korean Intellectual Property Office and assigned Serial number 10-2017-0053945, the entire disclosure of each of which is hereby incorporated by reference.

TECHNICAL FIELD

The present disclosure relates to an apparatus and a method for communication connection through downloading and installing a communication service from a communication system to a terminal. More particularly, the present disclosure relates to an apparatus and a method for downloading, installing, and managing a profile online in a communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

A universal integrated circuit card (UICC) is a smart card used to be inserted into a mobile communication terminal or the like, and is called a UICC card. The UICC may include an access control module for accessing a network of a mobile communication service provider. Examples of such an access control module may be a universal subscriber identity module (USIM), a subscriber identity module (SIM), and an Internet protocol (IP) multimedia service identity module (ISIM). The UICC including the USIM may be normally called the USIM card. In the same manner, the UICC including the SIM module may be normally called the SIM card. In the following description of the present disclosure, the SIM card will be normally used to include the UICC card, the USIM card, and the UICC including the ISIM. That is, although the SIM card is mentioned, the technical characteristic thereof may also be applied to the USIM card, the ISIM card, or the general UICC card in the same manner.

The SIM card stores personal information of a mobile communication subscriber, and enables the subscriber to use safe mobile communications through performing subscriber authentication and traffic security key generation during accessing to a mobile communication network.

At the time of proposing the present disclosure, in general, the SIM card is manufactured as a dedicated card for a specific mobile communication service provider by the request of the corresponding service provider during manufacturing of the card, and authentication information for accessing to the network of the corresponding service provider, for example, a USIM application and international mobile subscriber identity (IMSI), K value, and OPc value, is embedded in advance in the card before shipping. Accordingly, the manufactured SIM card is delivered to the corresponding mobile communication service provider, and then is provided to the subscriber. Thereafter, if needed, management, such as installation, correction, and deletion, of applications in the UICC may be performed using technology, such as over-the-air (OTA). The subscriber can use the network and application services of the corresponding mobile communication service provider through insertion of the UICC card into a subscriber's mobile communication terminal. In the case of replacement of the terminal, the UICC card may be removed from the existing terminal and then may be inserted into a new terminal, and thus it is possible to use the authentication information, mobile communication phone number, personal phonebook, and the like stored in the UICC card as they are in the new terminal.

However, the SIM card is inconvenient in use in the case where a mobile communication terminal user intends to receive a service provided from another mobile communication service provider because the user should physically acquire a SIM card for the service. For example, in the case of making a trip to another country, the terminal user should purchase a local SIM card in order to receive the local mobile communication service. Although a roaming service may somewhat address the problem of inconvenience, the user may be unable to receive the service due to expensive fees or nonexistent agreement between communication service providers.

On the other hand, in the case where the SIM module is remotely downloaded and installed in the UICC card, the problem of inconvenience as described above can be considerably addressed. That is, the user can download the SIM module of the mobile communication service intended to be used into the UICC card at a desired time. A plurality of SIM modules may be downloaded and installed in the UICC card, and one of the downloaded SIM modules may be selected to be used. The UICC card may be or may not be fixed to the terminal. In particular, the UICC fixed to the terminal is called an embedded UICC (eUICC), and the eUICC means a UICC card which is normally fixed to the terminal and can remotely download and select the SIM module. In the present disclosure, the UICC card capable of remotely downloading and selecting the SIM module is commonly called the eUICC. That is, the UICC card that is fixed to or is not fixed to the terminal among the UICC cards capable of remotely downloading and selecting the SIM module is commonly called the eUICC. Further, downloaded SIM module information is commonly called an eUICC profile.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for a terminal to perform communication connection through selection of a communication service in a communication system.

Another aspect of the present disclosure is to provide an apparatus and a method for a terminal to download online, install, and manage a profile for communication connection in a communication system.

Another aspect of the present disclosure is to provide an apparatus and a method for safely providing a profile to a terminal in a communication system.

In particular, the present disclosure proposes a method for addressing the followings for the above-described aspect.

Method for a terminal to transfer a message for requesting profile download or remote profile management to a profile management server subscription manger data preparation plus (SM-DP+).

Method for a profile management server SM-DP+ to selectively send profile download or remote profile management in reply to a terminal and to send reference information to be used when the terminal generates a message for requesting profile download or remote profile management to be transferred to a next stage in reply.

Message exchange procedure between the terminal and the profile management server SM-DP+.

In accordance with an aspect of the present disclosure, a terminal in a wireless communication system is provided. The terminal includes an input unit (user interface) configured to display and receive an input of a type of an event (profile download or remote profile management) to be performed by the terminal from a user, a transmission unit capable of transmitting to a profile management server SM-DP+ one or more of embedded universal integrated circuit card (eUICC) identifier (EID) in the terminal, EventRequestType indicating the type of an event to be performed by the terminal, RPMConfig indicating whether the terminal permits the remote profile management, integrated circuit card ID (ICCID) of a profile that is a subject for which the terminal is to perform the remote profile management, and OperatorID of a service provider currently providing a communication service to the terminal, a reception unit capable of receiving, in response to this, from the profile management server SM-DP+ one or more events to be performed by the terminal and one or more of the type and the number of one or more events to be performed by the terminal next time, an input unit (user interface) configured to display to the user information on one or more events to be performed by the terminal, and to receive an input of a user consent to performing of the corresponding events, a processor configured to determine whether to proceed with or to stop performing of one or more received events based on the input consent, a processor configured to perform the event if it is determined to proceed with the performing of the event (i.e., if the user consent is input), a processor and a transmission unit configured to transmit the result of performing the event to the profile management server SM-DP+, and a processor and a transmission unit configured to transmit a message for requesting a next event to the profile management server SM-DP+ in accordance with the type and the number of the one or more events to be performed by the terminal next time.

In accordance with another aspect of the present disclosure, a profile management server SM-DP+ in a wireless communication system is provided. The profile management server SM-DP+ includes an event storage configured to store events (profile download or remote profile management) to be performed by an eUICC of a terminal, a processor and a determination unit configured to control and determine priorities of the events stored in the event storage, a reception unit configured to receive from the terminal one or more of EID in the terminal, EventRequestType indicating the type of the event to be performed by the terminal, RPMConfig indicating whether the terminal permits the remote profile management, ICCID of a profile that is a subject for which the terminal is to perform the remote profile management, and OperatorID of a service provider currently providing a communication service to the terminal, a reception unit capable of receiving eUICC authentication information including signature, a determination unit configured to select one or more event to be performed by the terminal through comparison of the received message of the terminal with the priorities of the events stored in the event storage of the profile management server SM-DP+, a determination unit configured to grasp the type and the number of one or more events to be performed by the terminal next time among the events stored in the event storage, a transmission unit capable of transmitting the type and the number of one or more events to be performed by the terminal next time, a reception unit capable of receiving the result of performing the event from the terminal, and a reception unit capable of receiving a message for requesting a next event from the terminal.

In accordance with another aspect of the present disclosure, a method by a terminal in a wireless communication system is provided. The method includes transmitting, to a server, a universal integrated circuit card (UICC) related message to request an event for the terminal, wherein the UICC related message includes information on an operation type of the event, receiving, from the server, a response message including data corresponding to the operation type, and performing an operation based on the data.

In accordance with another aspect of the present disclosure, a terminal in a wireless communication system is provided. The terminal includes a transceiver and a processor coupled with the transceiver and configured to control to transmit, to a server, a UICC related message to request an event for the terminal, wherein the UICC related message includes information on an operation type of the event, receive, from the server, a response message including data corresponding to the operation type, and perform an operation based on the data.

In accordance with another aspect of the present disclosure, a method by a server in a wireless communication system is provided. The method includes receiving, from a terminal, a UICC related message to request an event for the terminal, wherein the UICC related message includes information on an operation type of the event, and transmitting, to the terminal, a response message including data corresponding to the operation type.

In accordance with another aspect of the present disclosure, a server in a wireless communication system is provided. The server includes a transceiver and a processor coupled with the transceiver and configured to control to receive, from a terminal, a UICC related message to request an event for the terminal, wherein the UICC related message includes information on an operation type of the event, and transmit, to the terminal, a response message including data corresponding to the operation type.

The technical aspects to be performed by the present disclosure are not limited to those as described above, but other unmentioned aspects will be clearly understood by those of ordinary skill in the art to which the present disclosure pertains from the following description.

In accordance with another aspect of the present disclosure, in the communication system, the terminal may notify the profile management server SM-DP+ of the current user's input, and selectively receive the event to be currently performed among the profile download or the remote profile management from the profile management server SM-DP+, and the event to be performed next time may be guided to the terminal. Through this, in the case where one or more events (profile download or remote profile management) are in a standby state in the profile management server SM-DP+, the terminal can automatically request, receive, and then perform the next event.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D are diagrams illustrating a method for determining whether a profile server can bind one or more events in a bundle to perform bundle transmission according to an embodiment of the present disclosure;

Throughout the drawings, it should be noted that like reference numbers are used to depict the same or similar elements, features, and structures.

DETAILED DESCRIPTION

Figure 1:
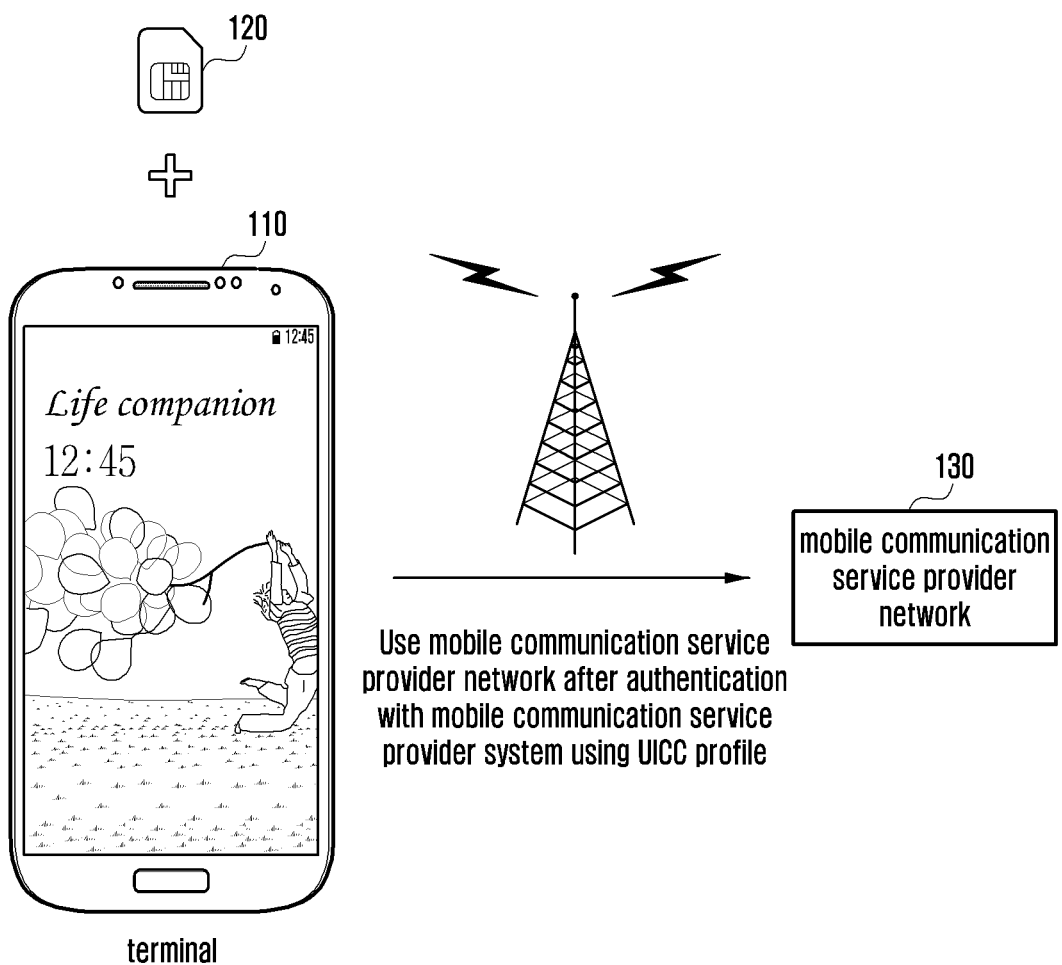
FIG. 1 is a diagram illustrating a method for a terminal to connect to a mobile communication network using universal integrated circuit card (UICC) embedded with a fixed profile according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments, explanation of the technical contents that are well-known in the technical fields to which the present disclosure pertains and are not directly related to the present disclosure will be omitted in the case where it is determined that they obscure the subject matter of the present disclosure in unnecessary detail.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the various embodiments to be described in detail with reference to the accompanying drawings. However, the present disclosure is not limited to the various embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a non-transitory computer-usable or computer-readable memory that can direct a computer or another programmable data processing apparatus to function in a particular manner, such that the instructions stored in the non-transitory computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Specific terms used in the following description are provided to help understanding of the present disclosure, and may be modified in different forms within a range that does not deviate from the technical idea of the present disclosure.

First, terms used in the description will be defined.

In the description, a universal integrated circuit card (UICC) is a smart card used to be inserted into a mobile communication terminal, and means a chip which stores therein personal information, such as network access authentication information of a mobile communication subscriber, phonebook, and short message service (SMS), and can safely use the mobile communication by performing subscriber authentication and traffic security key generation when accessing a mobile communication network, such as global satellite movement (GSM), wideband code division multiple access (WCDMA), and long-term evolution (LTE). In the UICC, communication applications, such as subscriber identification module (SIM), universal SIM (USIM), and Internet protocol (IP) multimedia SIM (ISIM), are embedded in accordance with the type of the mobile communication network accessed by the subscriber, and the UICC may provide an upper-level security function for embedding of various application programs, such as e-wallet, ticketing, and e-passport.

In the description, an embedded UICC (eUICC) is a chip type security module embedded in the terminal other than a detachable type that can be inserted into or detached from the terminal. The eUICC may download and install a profile using over-the-air (OTA) technique. The eUICC may be called a UICC in which profile download and installation can be performed.

In the description, a method for downloading and installing a profile in the eUICC using the OTA technique may be applied to a detachable type UICC that can be inserted into or detached from the terminal. That is, an embodiment of the present disclosure may be applied to the UICC capable of downloading and installing a profile using the OTA technique.

In the description, the term "UICC" may be mixedly used with SIM, and the term "eUICC" may be mixedly used with eSIM.

In the description, the profile may mean packaging of an application, a file system, and an authentication key value stored in the UICC in the form of software.

In the description, the USIM profile may have the same meaning as the profile, or may mean packaging of information included in the USIM application in the profile in the form of software.

In the description, a profile providing server may include a function of generating a profile, encrypting the generated profile, generating a remote profile management command, or encrypting the generated remote profile management command, and may be expressed as a subscription manager data preparation (SM-DP), a subscription manger data preparation plus (SM-DP+), an off-card entity of profile domain, a profile encryption server, a profile generation server, a profile provisioner (PP), a profile provider, or a profile provisioning credentials holder (PPC holder).

In the description, the profile management server may be expressed as a subscription manager secure routing (SM-SR), a subscription manger secure routing plus (SM-SR+), an off-card entity of eUICC profile manager, a profile management credentials holder (PMC holder), or an eUICC manager (EM).

In the present description, the profile providing server may be commonly called as the profile providing server to which a function of the profile management server is added. Accordingly, in various embodiments of the present disclosure, that is, in beyond technology, it is also possible that the operation of the profile providing server is performed by the profile management server. In the same manner, it is also possible the operation described with respect to the profile management server or SM-SR may be performed by the profile providing server.

The term "terminal" used in the description may be called a mobile station (MS), user equipment (UE), user terminal (UT), wireless terminal, access terminal (AT), terminal, subscriber unit, subscriber station (SS), wireless device, wireless communication device, wireless transmit/receive unit (WTRU), moving node, mobile, or other terms. Various embodiments of the terminal may include a cellular phone, a smart phone having a wireless communication function, a personal digital assistant (PDA), wireless modem, a portable computer having a wireless communication function, an imaging device, such as a digital camera having a wireless communication function, a gaming device having a wireless communication function, a music storage and reproduction home appliance having a wireless communication function, an Internet home appliance capable of wireless Internet connection and browsing, a portable unit or terminal integrating combinations of such functions. Further, the terminal may include a machine to machine (M2M) terminal, or machine type communication (MTC) terminal/device, but is not limited thereto. In the description, the terminal may be called an electronic device.

In the description, a UICC capable of downloading and installing a profile may be embedded in the electronic device. If the UICC is not embedded in the electronic device, the UICC that is physically separated from the electronic device may be inserted into the electronic device to be connected to the electronic device. For example, the card type UICC may be inserted into the electronic device. The electronic device may include the terminal, and in this case, the terminal may be a terminal including the UICC capable of downloading and installing a profile. The UICC may be embedded in the terminal, and if the terminal and the UICC are separated from each other, the UICC may be inserted into the terminal to be connected to the terminal. The UICC capable of downloading and installing a profile may be called, for example, an eUICC.

In the description, the terminal or the electronic device may include software or an application installed in the terminal or the electronic device to control the UICC or eUICC. The software or the application may be called, for example, a local profile assistant (LPA).

In the description, a profile discriminator may be called a profile ID, an integrated circuit card ID (ICCID), a machine ID, an event ID, an activation code, an activation code token, ISD-P or a factor matching a profile domain (PD). The profile ID may indicate an inherent identifier of each profile. The profile discriminator may include an address of a profile providing server (SM-DP+) capable of indexing the profile.

In the description, the eUICC ID may be an inherent identifier of the eUICC embedded in the terminal, and may be called an eUICC identifier (EID). Further, if a provisioning profile has already been embedded in the eUICC, it may be a profile ID of the corresponding provisioning profile. Further, in an embodiment of the present disclosure, if the terminal and the eUICC chip are not separated from each other, it may be a terminal ID. Further, it may be called a specific secure domain of the eUICC chip.

In the description, a profile container may be called a profile domain. The profile container may be a security domain.

In the description, an application protocol data unit (APDU) may be a message for the terminal to interlock with the eUICC. Further, the APDU may be a message for a PP or PM to interlock with the eUICC.

In the description, PPC may be a mean used to perform mutual authentication between the profile providing server and the eUICC, profile encryption, and signature. The PPC may include one or more of a symmetric key, a Rivest Shamir Adleman (RSA) certificate and a private key, an elliptic curved cryptography (ECC) certificate and a private key, a root certification authority (CA), and a certificate chain. Further, if a plurality of profile providing servers are provided, different PPCs for the plurality of profile providing servers may be stored in the eUICC or may be used.

In the description, PMC may be a mean used to perform mutual authentication between the profile management server and the eUICC, transmitted data encryption, and signature. The PMC may include one or more of a symmetric key, an RSA certificate and a private key, an ECC certificate and a private key, a root CA, and a certificate chain. Further, if a plurality of profile management servers are provided, different PMCs for the plurality of profile management servers may be stored in the eUICC or may be used.

In the description, an application identifier (AID) may be referred to. This value may be a discriminator for discriminating between different applications in the eUICC.

In the description, an event may be a term commonly calling profile download, remote profile management, or other profile or eUICC management/processing command. The profile download may be mixedly used with profile installation. Further, the event type may be used as a term indicating whether a specific event is profile download or remote profile management or whether it is other profile or eUICC management/processing command, and the event type may be called an operation type (or OperationType), an operation class (or OperationClass), an event request type, an event class, or an event request class.

In the description, a profile package may be mixedly used with a profile, or may be used as a term indicating a data object of a specific profile, and the profile package may be called a profile TLV or profile package TLV. If the profile package is encrypted using an encryption parameter, it may be called a protected profile package (PPP) or a protected profile package TLV (PPP TLV). If the profile package is encrypted using an encryption parameter that can be decrypted only by a specific eUICC, it may be called a bound profile package (BPP) or a bound profile package TLV (BPP TLV). The profile package TLV may be a data set expressing information that constitutes a profile in a tag, length, and value (TLV) type.

In the description, the remote profile management (RPM) may be called a profile remote management, remote management, remote management command, remote command, RPM package, profile remote management package, remote management package, remote management command package, or remote command package. The RPM may be used to change the state (enabled, disabled, or deleted) of a specific profile or to update the contents of a specific profile (e.g., profile nickname or profile metadata). The RPM may include one or more remote management commands, and in this case, the profiles that are the subjects of the respective remote management commands may be equal to or may be different from each other.

In the description, AKA may indicate authentication and key agreement, and may indicate an authentication algorithm for accessing to 3rd generation partnership project (3GPP) and 3GPP2 networks.

In the description, K is an encryption key value stored in the eUICC used for an AKA authentication algorithm.

In the description, OPc is a parameter value that can be stored in the eUICC used for the AKA authentication algorithm.

In the description, NAA is a network access application program, and may be an application program, such as USIM or ISIM, stored in the UICC to access the network. The NAA may be a network access module.

Further, in describing the present disclosure, a detailed description of related known functions or configurations will be omitted if it is determined that it obscures the subject matter of the present disclosure in unnecessary detail.

FIG. 1 is a diagram illustrating a method for a terminal to connect to a mobile communication network using UICC embedded with a profile fixed to the terminal according to an embodiment of the present disclosure.

Referring to FIG. 1, a UICC 120 may be inserted into a terminal 110. In this case, the UICC may be of a detachable type, or may be pre-embedded in the terminal. The fixed profile of the UICC embedded with the fixed profile means that "access information" capable of accessing to a specific communication service provider is fixed. The access information may be, for example, the international mobile subscriber identity (IMSI) that is the subscriber discriminator and a K or Ki value that is used for authentication in the network together with the subscriber discriminator.

Then, the terminal may perform authentication with an authentication processing system (e.g., home location register (HLR) or AuC) of a mobile communication service provider using the UICC. The authentication process may be an authentication and key agreement (AKA) process. If the authentication has succeeded, the terminal may then use a mobile communication service, such as phone call or use of mobile data, using a mobile communication service provider network 130 of the mobile communication system.

Hereafter, reference will be made to a terminal 230 and a profile server 250. The terminal 230 may be the terminal 110. The terminal 230 may include at least one of an LPA or an eUICC. The profile server 250 may include an SM-DP+.

Figure 2:
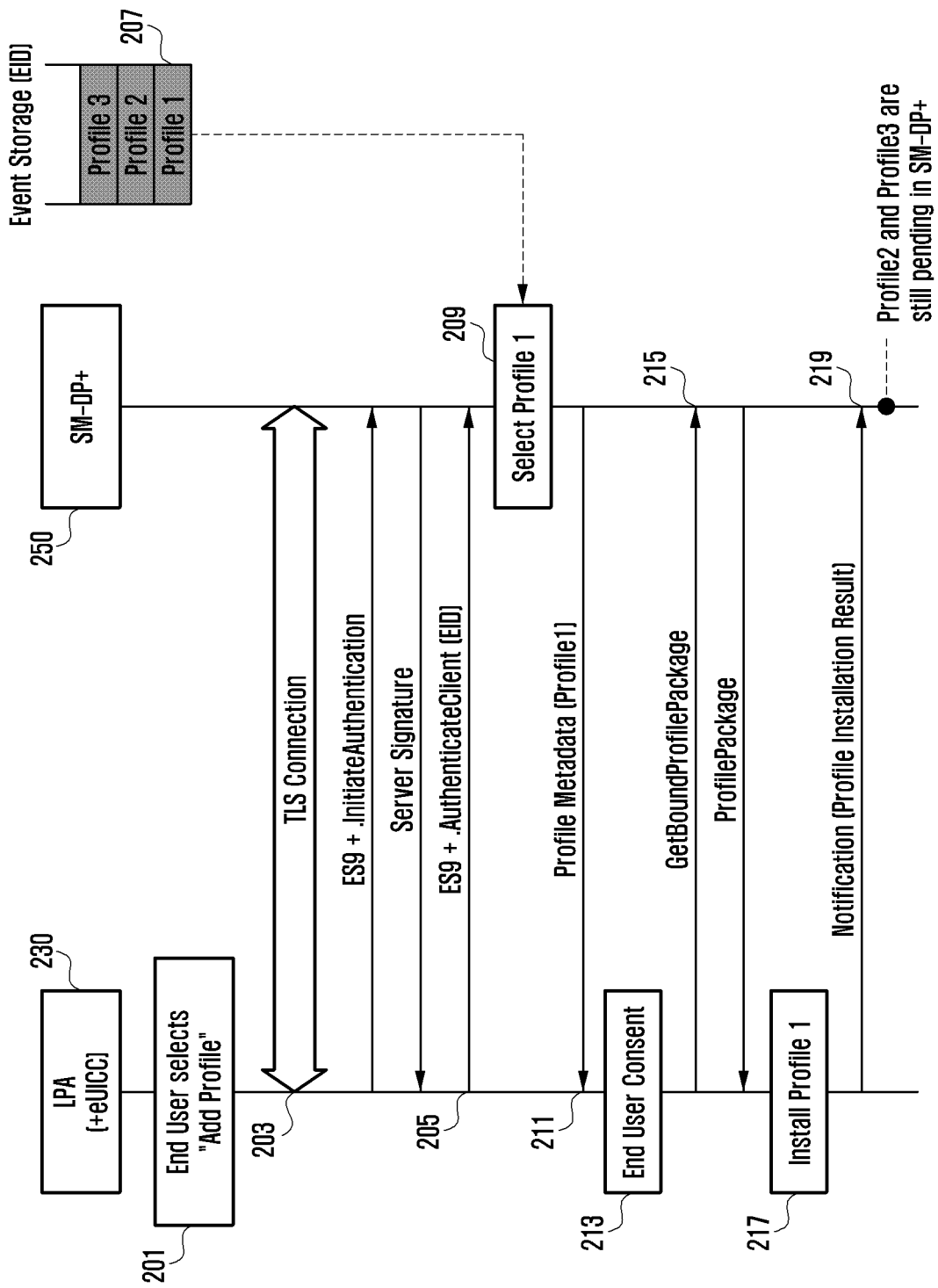
FIG. 2 is a diagram illustrating a message exchange procedure between a terminal and a profile server in the case of installing one or more profiles through a profile server according to an embodiment of the present disclosure

FIG. 2 is a diagram illustrating a message exchange procedure between a terminal 230 and a profile server 250 in the case of installing one or more profiles through the profile server according to an embodiment of the present disclosure.

Referring to FIG. 2, at operation 201, the terminal 230 may receive an "add profile" command from a user, and at operation 203, it may perform TLS connection and mutual authentication with the profile server 250. At operation 205, the terminal may transfer to the profile server 250 an EID of the terminal as the final procedure of the mutual authentication procedure. At operation 207, the profile server may confirm a list of events to be installed in the corresponding terminal through the EID. At operation 209, the profile server may select an event having the highest priority (in this embodiment, profile 1 installation) among the events in the list. At operation 211, the profile server may send metadata of the selected profile to the terminal in replay. At operation 213, the terminal may obtain user consent to the profile installation through illustration of the metadata of the profile to the user. At operation 215, the terminal may transfer the user consent to the profile server and may receive a profile package. At operation 217, the terminal may successfully install the profile package, and at operation 219, it may transfer the result to the profile server.

According to the profile package installation procedure, if one or more events are in a standby state in the profile server, it is not possible to notify the terminal that further events in the standby state remain in the profile server after performing and processing a specific event. In addition, in order to install one or more profiles, the user should input an "add profile" command to the terminal to cause inconvenience.

Figure 3:
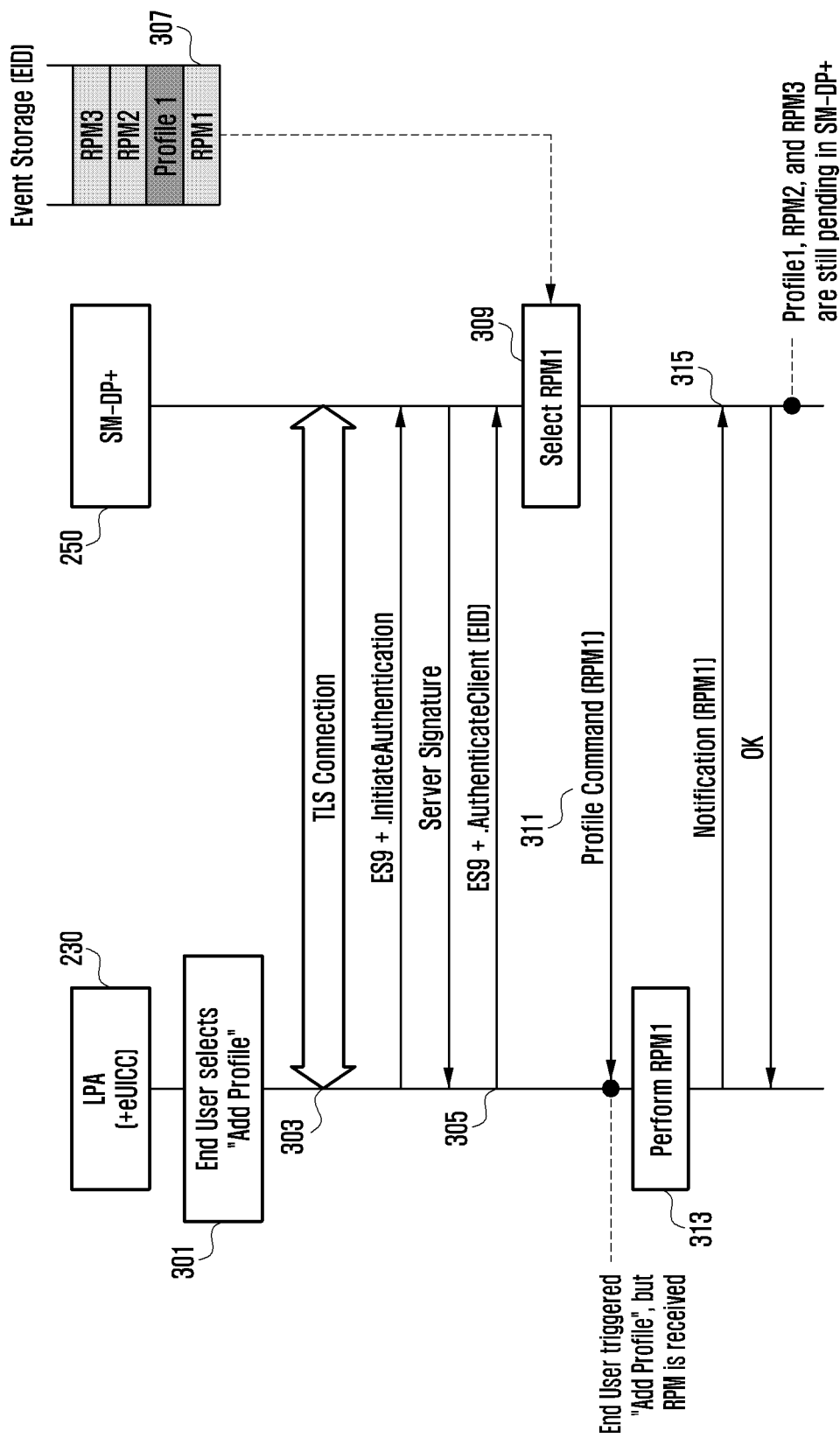
FIG. 3 is a diagram illustrating a message exchange procedure between a terminal and a profile server in the case where one or more profiles are installed through a profile server and one or more remote profile managements are performed according to an embodiment of the present disclosure.

FIG. 3 is a diagram illustrating a message exchange procedure between a terminal 230 and a profile server 250 in the case where one or more profiles are installed through the profile server and one or more remote profile managements are performed according to an embodiment of the present disclosure.

Referring to FIG. 3, at operation 301, the terminal 230 may receive an "add profile" command from a user, and at operation 303, it may perform TLS connection and mutual authentication with the profile server 250. At operation 305, the terminal may transfer to the profile server 250 an EID of the terminal as the final procedure of the mutual authentication procedure. At operation 307, the profile server may confirm a list of events (profile or remote management) to be installed in the corresponding terminal through the EID. At operation 309, the profile server may select an event having the highest priority (in this embodiment, remote management 1) among the events in the list. At operation 311, the profile server may send the selected remote management command to the terminal in replay. At operation 313, the terminal may perform the received remote management command. At operation 315, the terminal may transfer the result of performing the remote management command to the profile server.

According to the profile installation and remote management performing procedure, if one or more events are in a standby state in the profile server, it is not possible to notify the terminal that further events in the standby state remain in the profile server after performing and processing a specific event. In addition, although the user has input the "add profile" command to the terminal at operation 301, the terminal preferentially receives the remote management command that is the event having the highest priority from the profile server, and performs an operation that is against the user's intention to cause confusion to the user.

Figure 4:
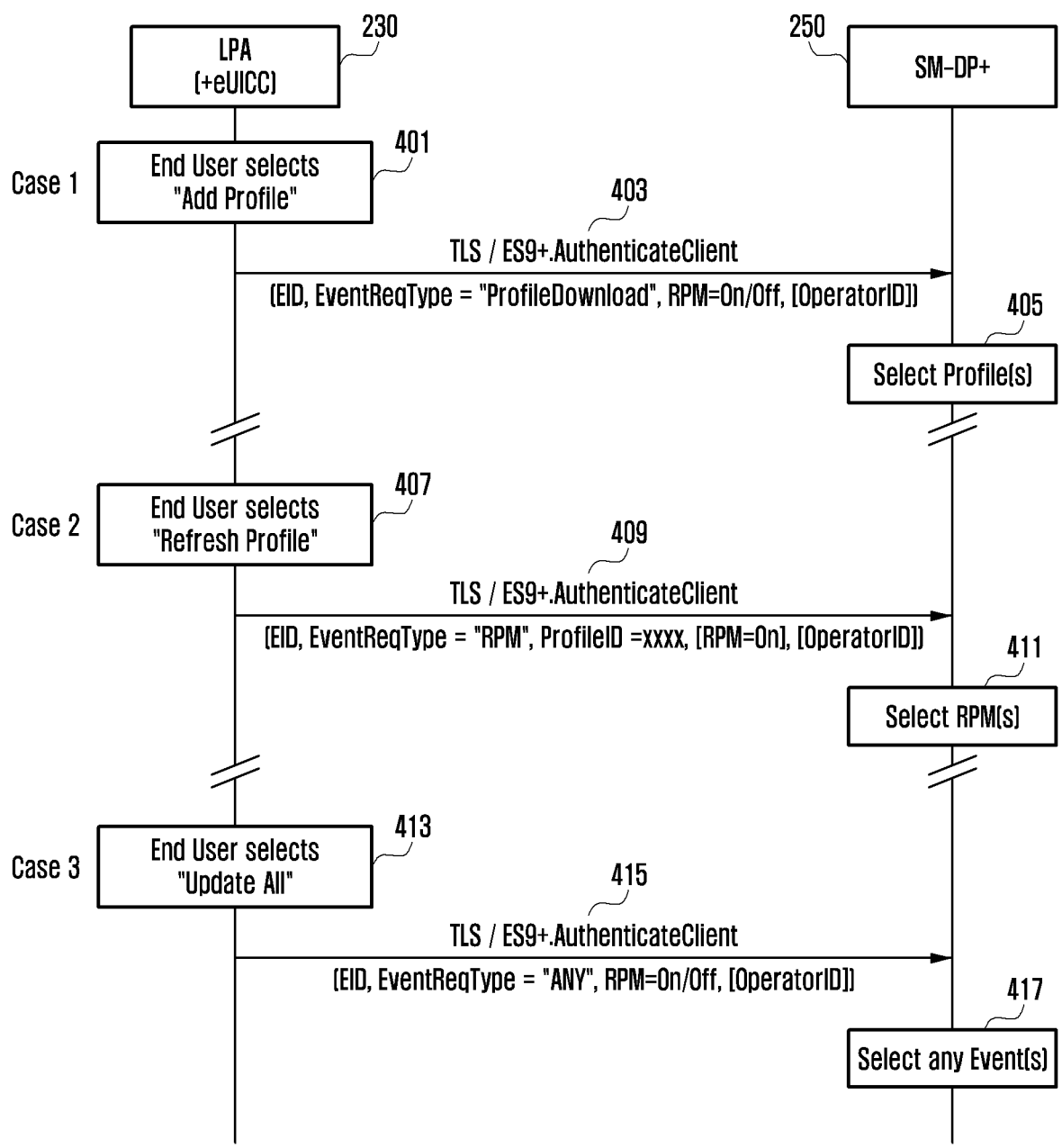
FIG. 4 is a diagram illustrating a method for specifying the type of an event corresponding to a command input by a user when a terminal requests the event from a profile server according to an embodiment of the present disclosure.

FIG. 4 is a diagram illustrating a method for specifying the type of an event corresponding to a command input by a user when a terminal 230 requests the event from a profile server 250 according to an embodiment of the present disclosure. Although case 1, case 2, and case 3 of FIG. 4 illustrate respective independent embodiments, two or more cases may be successively performed.

Referring to FIG. 4, at operation 401, the terminal may receive an "add profile" command from a user. At operation 403, the terminal may complete TLS secure connection and mutual authentication with the profile server with respect to the user input, and may request an event from the profile server 250 by specifying the event type corresponding to the profile download. In this case, the event type may be displayed as a text (in this embodiment, "ProfileDownload") or as one value of the corresponding enumerate. For example, if the enumerate values "0, 1" correspond to the "profile download" and "remote profile management", the numeral "0" may be used instead of the text "ProfileDownload". Further, at operation 403, the terminal may notify the profile server whether the user currently activates (on) the remote profile management function of the terminal, or may notify of the service provider's identifier (OperatorID) that is currently providing the communication service to the corresponding terminal. At operation 405, the profile server may select a profile installation event having high priority in accordance with the terminal's request. A method for the profile server to use the event type, profile management function activation/inactivation, and service provider identifier information and a method for managing the priority of an event will be described in detail according to an embodiment to be described later.

Further, referring to FIG. 4, at operation 407, the terminal may receive a "refresh profile" command from a user. At operation 409, the terminal may complete TLS secure connection and mutual authentication with the profile server with respect to the user input, and may request an event from the profile server 250 by specifying the event type corresponding to the remote profile management. In this case, the event type may be displayed as a text (in this embodiment, "RPM") or as one value of the corresponding enumerate. For example, if the enumerate values "0, 1" correspond to the "profile download" and "remote profile management", the numeral "1" may be used instead of the text "RPM". Further, at operation 409, the terminal may notify the profile server whether the user currently activates (on) the remote profile management function of the terminal, or may notify of the service provider's identifier (OperatorID) that is currently providing the communication service to the corresponding terminal. At operation 411, the profile server may select a remote profile management event having high priority in accordance with the terminal's request. A method for the profile server to use the event type, profile management function activation/inactivation, and service provider identifier information and a method for managing the priority of an event will be described in detail according to an embodiment to be described later.

Further, referring to FIG. 4, at operation 413, the terminal may receive an "update all" command from a user. At operation 4015, the terminal may complete TLS secure connection and mutual authentication with the profile server with respect to the user input, and may request an event from the profile server 250 by specifying the event type corresponding to the profile download and the remote profile management. In this case, the event type may be displayed as a text (in this embodiment, "ANY") or as one or more values of the corresponding enumerate, or through composite application of the method used in the embodiment of the profile download or the remote profile management. For example, a text "ProfileDownload, RPM" may be used instead of the text "ANY", or if the enumerate values "0, 1, 2" correspond to the "profile download", "remote profile management", and "update all", the numeral "2" may be used or the enumerate values "0, 1" may be used. Further, at operation 415, the terminal may notify the profile server whether the user currently activates (on) the remote profile management function of the terminal, or may notify of the service provider's identifier (OperatorID) that is currently providing the communication service to the corresponding terminal. At operation 417, the profile server may select an event (profile download or remote profile management)

having high priority in accordance with the terminal's request. A method for the profile server to use the event type, profile management function activation/inactivation, and service provider identifier information and a method for managing the priority of an event will be described in detail according to an embodiment to be described later.

Figure 5:
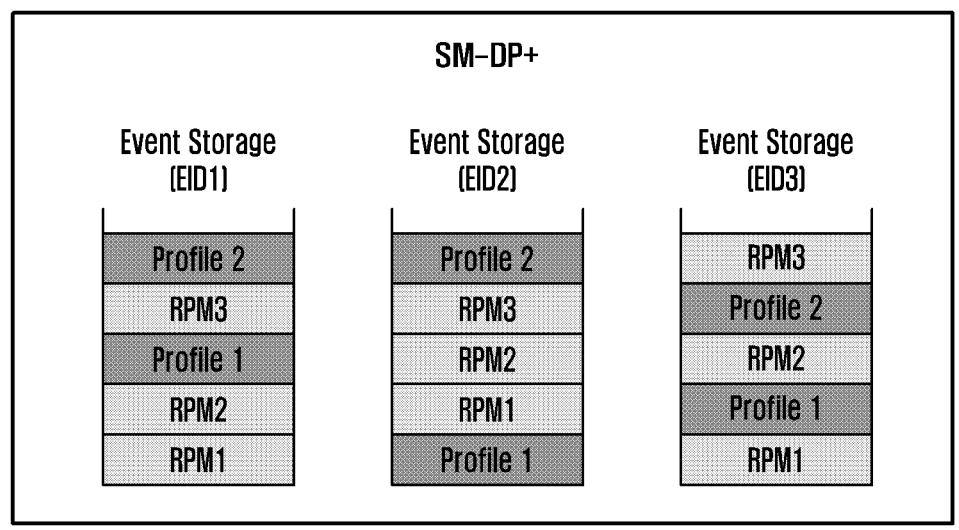
FIG. 5 is a diagram illustrating a method for a profile server to manage an event storage according to an embodiment of the present disclosure.

FIG. 5 is a diagram illustrating a method for a profile server to manage an event storage according to an embodiment of the present disclosure.

Referring to FIG. 5, a profile server may manage an event storage that is discriminated as an EID. In each event storage, one or more events (profile download or remote profile management) to be performed by the corresponding eUICC (or terminal) may be stored. Further, the events stored in the respective event storages may have their priorities, and a method for calculating the priority may follow one or more composite methods as follows, but the events are not limited to the list below.

The order of event registration in an event storage.
Priority value allocated when a service provider registers an event.
Event type (e.g., profile download may have a priority that is higher than the priority of remote profile management).
Priority value optionally determined and allocated by a profile server.

If one or more events have the same priority, the profile server may align the corresponding events in a certain order. In an embodiment of the present disclosure, it is exemplified that the priority of the event is managed in first-in first-out (FIFO) type in accordance with the order of event registration in the event storage. However, it is to be noted that the priority of the event may be calculated in various methods as described above.

FIGS. 6A, 6B, 6C, and 6D are diagrams illustrating a method for determining whether a profile server can bind a plurality of events in one message to perform bundle transmission in the case where a profile server transmits one or more events to the terminal according to an embodiment of the present disclosure.

Referring to FIGS. 6A, 6B, 6C, and 6D, the profile server may manage a table for determining whether it is possible to bind a specific event type with another event type for each event type to perform bundle transmission.

Referring to FIG. 6A, the profile server may determine to bind all events to perform bundle transmission regardless of the event type.

Referring to FIG. 6B, the profile server may be set to permit only binding of remote profile management events to perform bundle transmission, but may be set not to permit binding of profile download events or binding of a profile download event and a remote profile management event to perform bundle transmission.

Referring to FIG. 6C, the profile server may be set to permit only binding of the remote profile management event and the profile download event to perform bundle transmission, but may be set not to permit binding of profile download events or not to permit binding of remote profile management events to perform bundle transmission.

Referring to FIG. 6D, the profile server may not permit binding of any events to perform bundle transmission.

In this embodiment, two types of events are exemplified, but as described above, if the number of event types is increased to three or more, the size of the table may also be increased accordingly. Further, determination of the event types to be transmitted in a bundle is not limited to those as illustrated in FIGS. 6A, 6B, 6C, and 6D, and it may differ depending on combination of the events to be transmitted in a bundle.

Figure 7A:
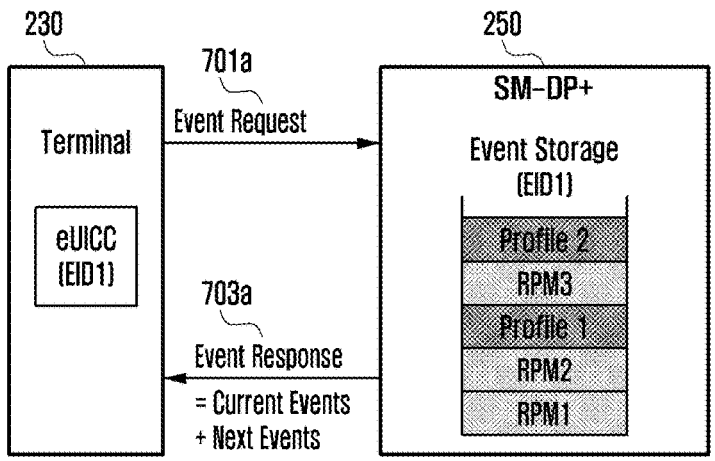
FIGS. 7A, 7B, and 7C are diagrams illustrating a method for a profile server to transfer an event to be currently performed when configuring an event response message according to an embodiment of the present disclosure.
Figure 7B:
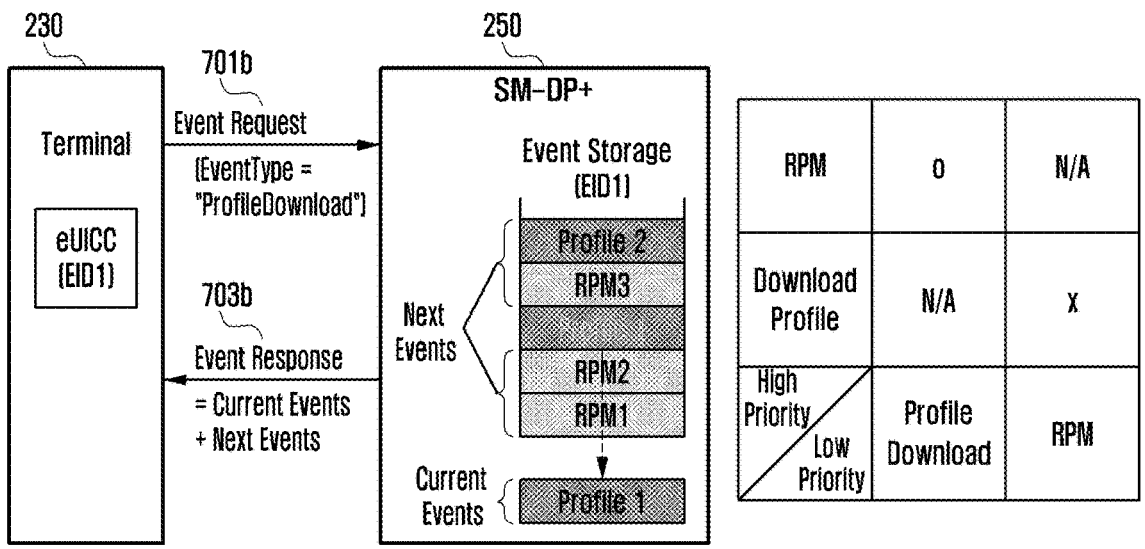
Figure 7C:
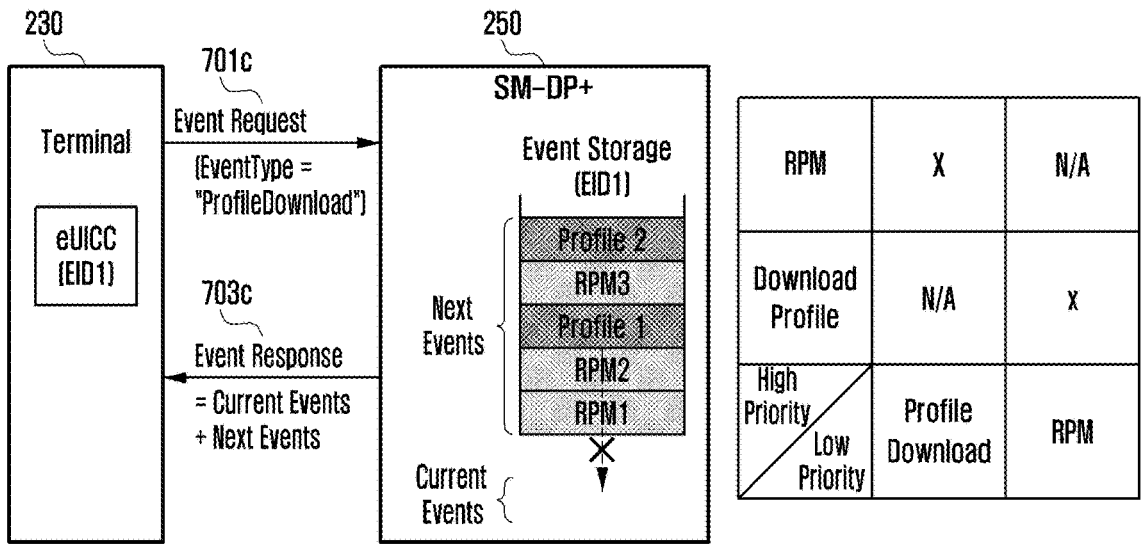

FIGS. 7A, 7B, and 7C are diagrams illustrating a method for a profile server to configure information of "current events" when the profile server configures a response message to an event request message of a terminal including the "current events" to be currently processed by the terminal and "next events" in a standby state in an event storage according to an embodiment of the present disclosure.

Referring to FIGS. 7A, 7B, and 7C, at operations 701A, 701B, and 701C, the terminal 230 may transmit an event request message to the profile server 250. The configuration and detailed explanation of the event request message have been made with reference to the embodiment of FIG. 4. With respect to the event request message of the terminal, the profile server, at operations 703A, 703B, and 703C, may configure an event response message using information on one or more "current events" selected from the event storage in accordance with the priority and events remaining in the event storage excluding the current events. In this case, selection of the current events may be performed as follows in accordance with the event type specified in the event request message of the terminal, event storage state of the profile server, and whether to permit preferential transmission.

The profile server may manage a priority setup table for permitting whether an event of a low priority can be transmitted to the terminal prior to an event of a high priority in accordance with the respective event types.

Referring to FIG. 7B, if the terminal requests, the profile download event may be set to be preferentially transmitted to the terminal even if the profile download event has a priority that is lower than the priority of the remote profile management event, whereas the remote profile management event may be set not to be preferentially transmitted to the terminal in response to the terminal's request if the remote profile management event has a priority that is lower than the priority of the profile download event. In this case, if the terminal specifically requests the profile download event in a state where the event priorities in the event storage are aligned in the order as in the embodiment of the profile server 250, a profile download event Profile1 corresponding to the third priority may be selected more preferentially than remote profile management events RPM1 and RPM2 corresponding to the first and second priorities, and may be transmitted to the terminal through a "current event" field. In this case, the residual events RPM1, RPM2, RPM3, and Profile2 may be included in the "next events" to be transmitted to the terminal 230 according to an embodiment of FIG. 8 to be described later.

Referring to FIG. 7C, except for the priority of the event, it may be set that any event is unable to be transmitted more preferentially than other events. In this case, even if the terminal specifically requests the profile download event in a state where the event priorities in the event storage are aligned in the order as in the embodiment of the profile server 250, the remote profile management event RPM1 that has the highest priority should be preferentially performed, and the "current event" field becomes empty, and thus no event may be transmitted to the terminal. In this case, the residual events RPM1, RPM2, Profile1, RPM3, and Profile2 may be included in the "next events" to be transmitted according to an embodiment of FIG. 8 to be described later.

In the various embodiments of FIGS. 7A, 7B, and 7C, only one "current event" is selected in accordance with the preferential transmission setup, but it is to be noted that one or more events may be selected as described above as in the embodiment of FIGS. 6A, 6B, 6C, and 6D. For example, if bundle transmission of the profile download events is set to be possible as in the embodiment of FIG. 6A in addition to the embodiment of FIG. 7B, at operation 703B of FIG. 7B, two profile download events Profile1 and Profile2 may be simultaneously included in the "current events" field to be transmitted to the terminal 230.

Figure 8:
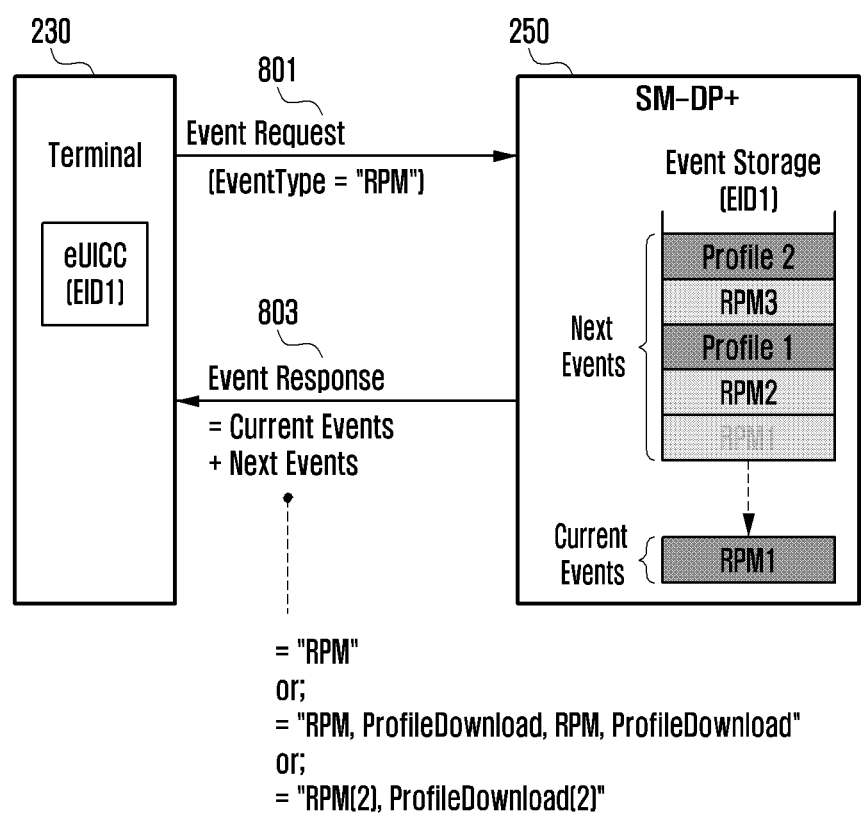
FIG. 8 is a diagram illustrating a method for a profile server to transfer an event to be performed next time when configuring an event response message according to an embodiment of the present disclosure.

FIG. 8 is a diagram illustrating a diagram illustrating a method for a profile server to configure information of "next events" when the profile server configures a response message to an event request message of a terminal including the "current events" to be currently processed by the terminal and "next events" in a standby state in an event storage according to an embodiment of the present disclosure.

Referring to FIG. 8, at operation 801, the terminal 230 may transmit an event request message to the profile server 250. The configuration and detailed explanation of the event request message have been made with reference to the embodiment of FIG. 4. With respect to the event request message of the terminal, the profile server, at operation 803, may configure an event response message using information on one or more "current events" selected from the event storage in accordance with the priority and events remaining in the event storage excluding the current events. In this embodiment, as selection of the current events, a case where one remote management event RPM1 is selected to suit the request of the terminal is illustrated. However, as in the embodiment of FIGS. 6A, 6B, 6C, and 6D, one or more events may be selected in accordance with whether the profile server can perform bundle transmission, and as in the embodiment of FIGS. 7A, 7B, and 7C, it is to be noted that the event type specified in the event request message of the terminal may be searched for from the event storage, and the corresponding event may be transmitted more preferentially than the event having the highest priority. Further, next event information may be compositely configured using one or more information elements as follows, but the usable information elements are not limited thereto.

Event type of an event having highest priority among residual events.

Event type of one or more residual events.

Existence/nonexistence of one or more residual events.

The number of event types when the residual events are classified by event types.

As an example, in an embodiment of FIG. 8, in the case of sending only the event type of the event having the highest priority in replay, an event response message may be configured as follows.

Current Events=RPM1, Next Events="RPM".

As another example, in an embodiment of FIG. 8, in the case of sending the event types of all remaining events in replay, an event response message may be configured as follows.

Current Events=RPM1, Next Events="RPM", ProfileDownload, RPM, ProfileDownload".

As still another example, in an embodiment of FIG. 8, in the case of sending the number of event types in reply through classification of the residual events by event types, an event response message may be configured as follows.

Current Events=RPM1, Next Events="RPM (2), ProfileDownload (2)".

As yet still another example, in an embodiment of FIG. 8, in the case of replying that one or more residual events remain regardless of the event type, an event response message may be configured as follows.

Current Events=RPM1, Next Events=TRUE.

In the above embodiment, the event type is displayed using a text ("RPM" or "ProfileDownload"). However, as described above as in the embodiment of FIG. 4, enumeration may also be used in addition to the text. Further, in the case of notifying the terminal that one or more events exist regardless of the event type, a binary recognizer (Boolean) having true/false instead of the text or enumerate may be used.

Figure 9:
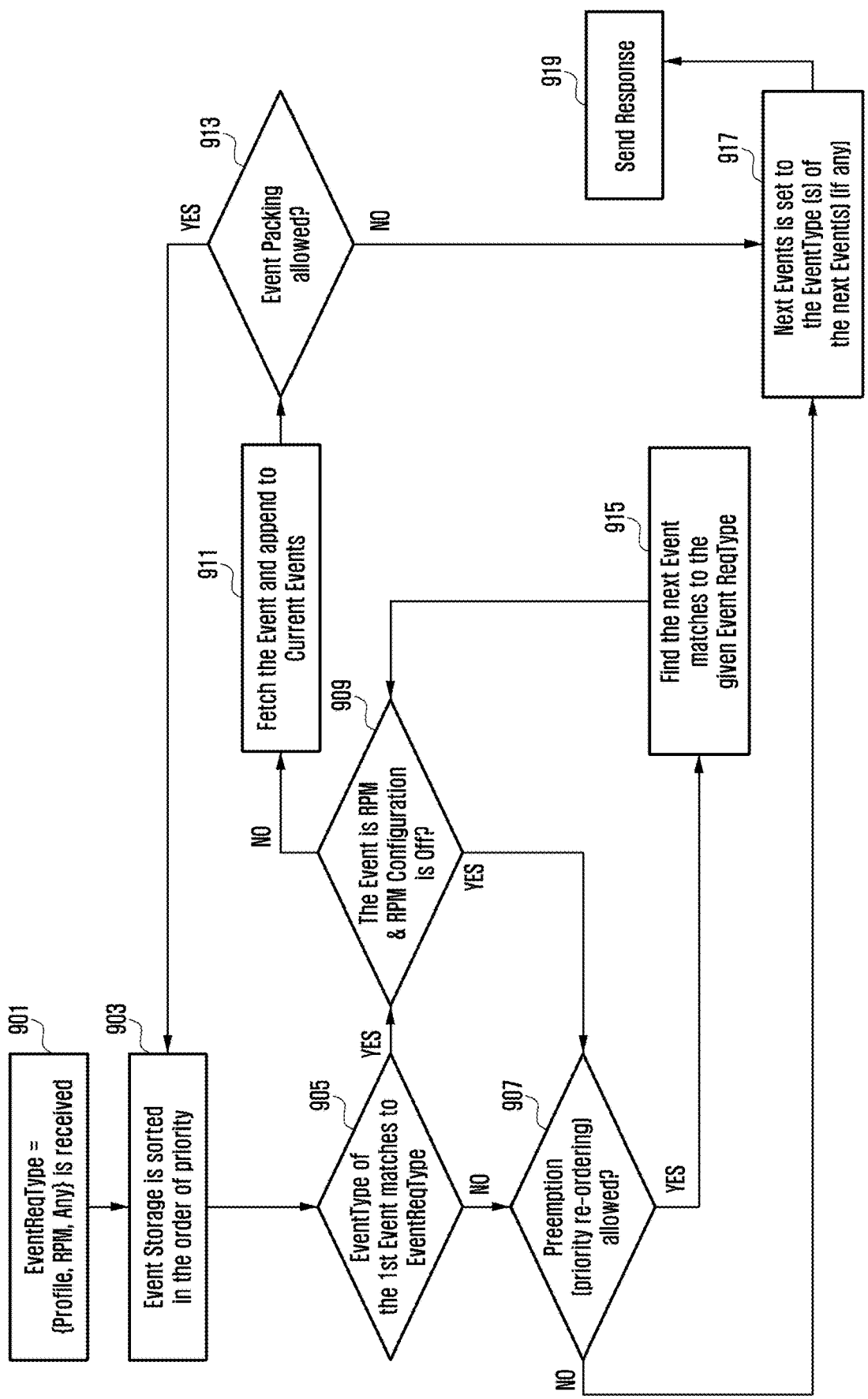
FIG. 9 is a diagram illustrating a procedure for a profile server to configure an event response message according to an embodiment of the present disclosure.

FIG. 9 is a diagram illustrating a procedure for a profile server to configure an event response message to an event request message of a terminal with reference to the event bundle transmission and the event preferential transmission setup as described in the various embodiments of FIGS. 6A, 6B, 6C, 6D, 7A, 7B, 7C, and 8 according to an embodiment of the present disclosure.

Referring to FIG. 9, at operation 901, the profile server may receive an event request message from the terminal. The event request message may specify the type of an event requested by the terminal according to the above-described embodiment of FIG. 4 and whether a remote profile management function is currently activated/inactivated (on/off) in the terminal.

After performing operation 901 or if confirmation at operation 913 has failed, the profile server, at operation 903, may align events in the event storage corresponding to the eUICC of the terminal that has transmitted the event request message in the order of priorities according to the embodiment of FIG. 5 as described above.

At operation 905, the profile server confirms whether the type of the event having the highest priority in the event storage coincides with the type of the event requested by the terminal at operation 901.

If the confirmation procedure at operation 905 has failed or the confirmation procedure at operation 909 has succeeded, the profile server, at operation 907, confirms whether it is possible to transmit the event corresponding to the event type requested by the terminal according to the embodiment of FIGS. 7A, 7B, and 7C as described above more preferentially than the event having the highest priority in the event storage confirmed at operation 905.

If the confirmation procedure at operation 907 has succeeded, the profile server, at operation 915, searches for the event having the highest priority among the events that coincide with the event type requested by the terminal in the event storage.

If the confirmation procedure at operation 905 has succeeded, or after performing of the operation 915, the profile server, at operation 909, confirms whether the corresponding event is a remote profile management event and whether the remote profile management function of the terminal is currently inactivated (off) in the event request message of the terminal received at operation 901.

If the confirmation procedure at operation 909 has failed, the profile server extracts the corresponding event from the event storage according to the embodiment of FIGS. 7A, 7B, and 7C as described above, and adds the corresponding event to the "current events" field.

After performing operation 911, the profile server, at operation 913, confirms whether bundle transmission of the corresponding event and other events is possible according to the embodiment of FIGS. 6A, 6B, 6C, and 6D as described above.

If the confirmation procedure at operation 913 has failed, or the confirmation procedure at operation 907 has failed, the profile server, at operation 917, configures a "next events" field according to the embodiment of FIG. 8 as described above.

After performing operation 917, the profile server, at operation 919, may transmit to the terminal an event response message composed of "current events" and "next events". If transmission of the event response message has failed, or if a reply to the processing failure of the event response message is received from the terminal hereafter, the profile server may restore the event extraction operation in the event storage at operation 911 performed once or more.

Figure 10:
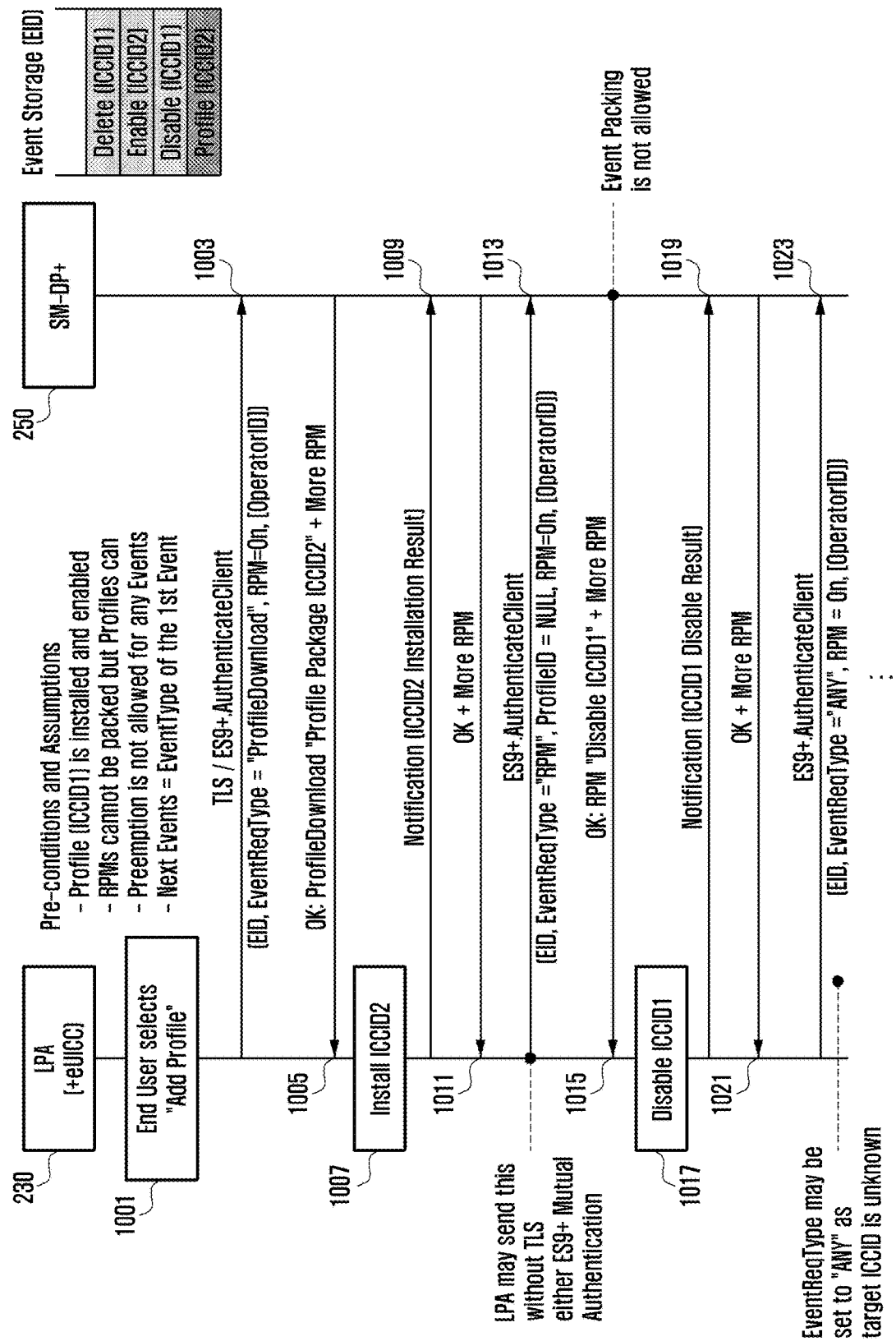
FIGS. 10, 11, and 12 are diagrams illustrating a message procedure for a terminal and a profile server to successively receive and perform one or more events according to an embodiment of the present disclosure.

FIG. 10 is a diagram illustrating an example of a procedure in which the terminal 230 successively receives one or more events from the profile server 250 to perform the received events according to an embodiment of the present disclosure.

In this embodiment, it is assumed that a profile corresponding to an ICCID1 is installed/activated in the terminal, a remote profile management function of the terminal is activated (on), the event storage of the profile server is aligned in accordance with the order of event registration time, bundle transmission of the remote profile management event is impossible, but bundle transmission of the profile download event is possible, preferential transmission of any event that deviates from the priority is impossible, and the "next events" are configured to describe only the event type of the event having the highest priority is described in the event storage.

Referring to FIG. 10, at operation 1001, the terminal may receive a command for "add profile" from a user.

At operation 1003, the terminal may perform TLS secure connection and mutual authentication procedure with the profile server, and may request a profile download event from the profile server to suit the user's request according to the embodiment of FIG. 4 as described above.

At operation 1005, the profile server may notify the terminal that one or more remote profile management events are in a standby state together with the profile download event ICCID2 that is the event having the highest priority in the event storage according to the various embodiments of FIGS. 6A, 6B, 6C, 6D, 7A, 7B, 7C, 8, and 9 as described above.

At operation 1007, the terminal may install the profile ICCID2 in accordance with the received profile download event.

At operation 1009, the terminal may transmit the performance result of the profile download event that has been completed (i.e., profile installation result (ICCID2 installation result)) to the profile server.

At operation 1011, the profile server may notify the terminal that the event performance result has been successfully received. Further, at not only operation 1005 but also operation 1011, the profile server may notify the terminal of "next events" remaining in the event storage. Two types of messages to notify the "next events" are mutually complementary, and the "next events" may be notified in both two messages or in one of the two messages. If the "next events" are notified in both the two messages, the "next events" lists included in the two messages may differ from each other. As an example, if the priorities of the events in the event storage of the profile server are changed during performing of the operations 1007 to 1009 after the message transmission at operation 1005, the "next events" list included in the message at operation 1011 may be changed.

At operation 1013, the terminal may request again the profile server to transmit the event to be performed next time according to the "next events" list notified by the profile server at operations 1005 to 1011. If the TLS secure connection and mutual authentication procedure between the terminal and the profile server at operation 1003 are still effective during transmission of the re-request message, the terminal may omit the TLS secure connection and mutual authentication procedure with the profile server. Further, if needed, the terminal may notify the user that the event is to be requested from the profile server, and may transmit an event request message to the profile server after obtaining a user consent. If the user does not consent, the terminal may end the procedure without requesting an additional event. Further, if the event to be performed next time in accordance with the "next events" list is the remote profile management event, an identifier of the profile to be the subject of the corresponding event is not clear, and thus the event request type EventReqType may be set as the remote profile management, but the profile identifier may not be specified. A method not to specify the profile identifier may transmit NULL character string, or may not transmit the profile identifier field.

At operation 1015, the profile server may notify the terminal that one or more remote profile management events are in a standby state together with the remote profile management event (update ICCID1) that is the event having the highest priority in the event storage.

At operation 1017, the terminal may manage the profile (change the contents of the profile corresponding to the ICCID1) in accordance with the received remote profile management event.

At operation 1019, the terminal may transmit to the profile server the performance result of the remote profile management event that has been completed (i.e., profile change result (ICCID1 update result)).

At operation 1021, the profile server may notify the terminal that the event performance result has been successfully received. Further, in the same manner as in the procedure at operation 1011 as described above, the profile server may notify the terminal of the "next events" remaining in the event storage at not only operation 1015 but also operation 1021. For detailed explanation of the configuration of the "next events" list, explanation of the operation 1011 may be referred to.

At operation 1023, in the same manner as in the procedure at operation 1013 as described above, the terminal may re-request the event to be performed next time from the profile server in accordance with the "next events" list notified by the profile server at operations 1015 to 1021. Regarding the detailed explanation of the TLS and secure connection and the user consent, explanation of the operation 1013 may be referred to. Further, if the event to be performed next time is the remote profile management event in accordance with the "next events" list, an identifier of the profile to be the subject of the corresponding event is not clear, and thus the terminal may set the event request type EventReqType to all events "ANY", but may not specify the profile identifier ProfileID. Regarding the method for specifying all events, the embodiment of FIG. 4 as described above may be referred to. Further, it could be easily understood that the subsequent procedure may be performed through repetition of the operations 1001 to 1023 as described above.

Figure 11:
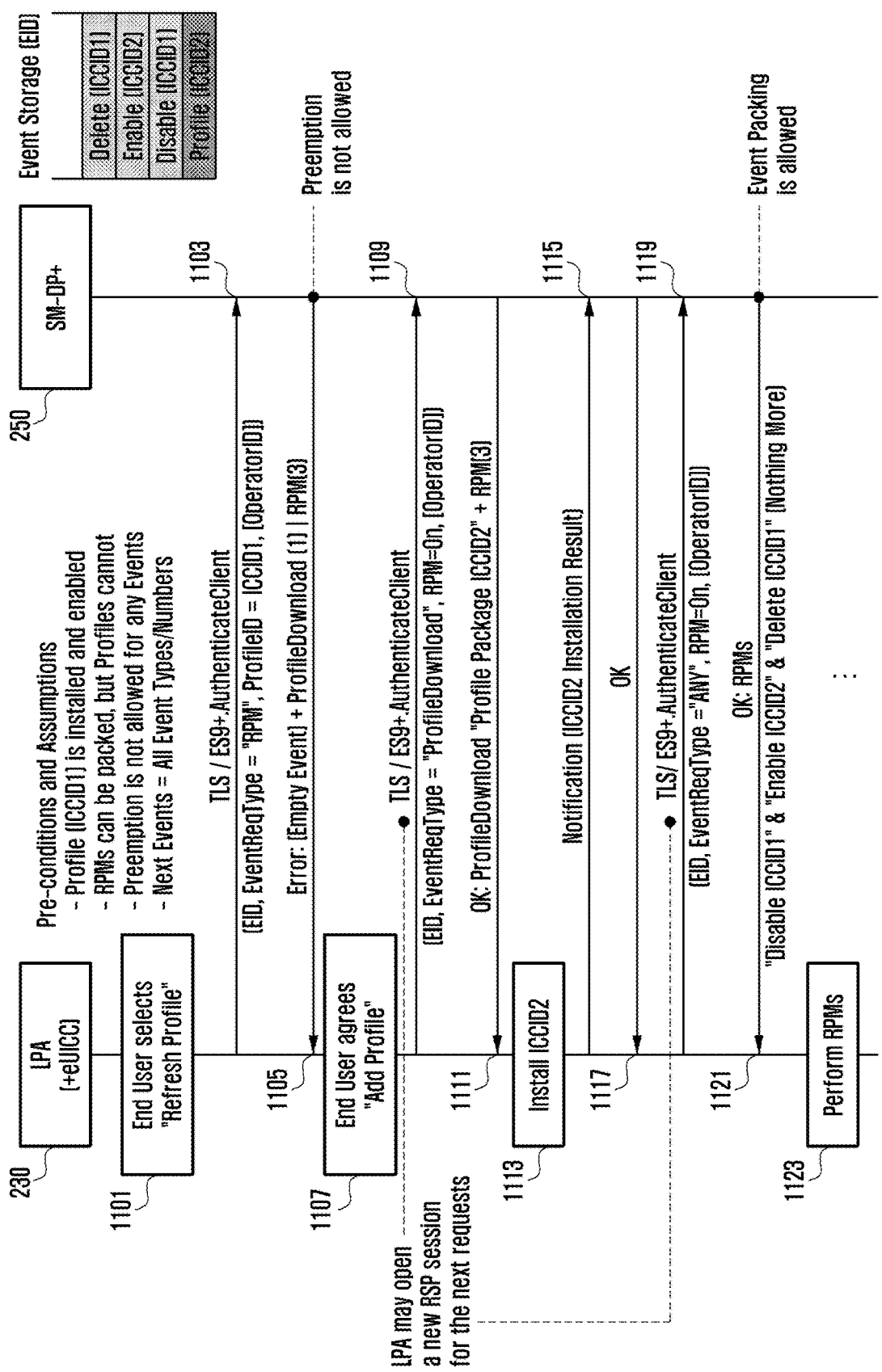

FIG. 11 is a diagram illustrating an example of a procedure in which the terminal 230 successively receives one or more events from the profile server 250 to perform the received events according to an embodiment of the present disclosure.

In this embodiment, it is assumed that a profile corresponding to an ICCID1 is installed/activated in the terminal, a remote profile management function of the terminal is activated (on), the event storage of the profile server is aligned in accordance with the order of event registration time, bundle transmission of the remote profile management event is possible, but bundle transmission of the profile download event is impossible, preferential transmission of any event that deviates from the priority is impossible, and the "next events" are configured to describe the type and the number of all events in the event storage.

Referring to FIG. 11, at operation 1101, the terminal may receive a specific profile (in this embodiment, ICCID1) selected by the user, and may receive a command for "refresh profile".

At operation 1103, the terminal may perform TLS secure connection and mutual authentication procedure with the profile server, and may request a remote profile management event from the profile server to suit the user's request according to the embodiment of FIG. 4 as described above.

At operation 1105, the profile server may search for a profile download event that is an event having the highest priority in the event storage according to the embodiment of FIGS. 6A, 6B, 6C, 6D, 7A, 7B, 7C, 8, and 9 as described above, and since the corresponding event does not coincide with the event type (remote profile management) requested by the terminal and preferential transmission that deviates from the priority is impossible, the profile server does not transfer any event, and the profile server may notify the terminal that one profile download event and three remote profile management events are in a standby state using the "next events" list.

At operation 1107, the terminal may notify the user who has commanded the refresh profile that the refresh profile is currently impossible and add profile should be preferentially performed, and may obtain a user consent in accordance with the received "next events" list. If the user does not consent, the terminal may end the procedure without additional operation.

At operation 1109, the terminal may re-request the profile server to send "next events" list notified by the profile server at operation 1105 and an event to be performed next time in accordance with the user consent received at operation 1107. If one or more of the TLS secure connection and the mutual authentication procedure between the terminal and the profile server at operation 1103 during transmission of the re-request message have already been ended or a new event request message should be discriminated by a new transaction ID on the policy of the profile server, the terminal may perform new TLS secure connection and mutual authentication procedure with the profile server.

At operation 1111, the profile server may notify the terminal that three remote profile management events are in a standby state using the "next events" list together with the profile download event ICCID2 that is the event having the highest priority in the event storage according to the various embodiments of FIGS. 6A, 6B, 6C, 6D, 7A, 7B, 7C, 8, and 9 as described above. In this embodiment, it is illustrated that the profile package is instantly transmitted in response to operation 1109. However, as exemplified in FIG. 2 as described above, profile metadata is preferentially transmitted at operation 211, user consent to the profile installation is obtained again at operation 213, and a profile package is transmitted to the terminal in the case where the terminal requests the profile package from the profile server at operation 215. In this case, an additional user consent may be integrated with the user consent at operation 1107.

At operation 1113, the terminal may install a profile ICCID2 in accordance with the received profile download event (more specifically, profile package).

At operation 1115, the terminal may transmit the performance result of the profile download event that has been completed (i.e., profile installation result (ICCID2 installation result)) to the profile server.

At operation 1119, the profile server may notify the terminal that the event performance result has been successfully received. Further, although not illustrated in the drawing, at operation 1119, the profile server may repeat the "next events" list at operation 1111 in the same manner as in the embodiment of FIG. 10 as described above.

At operation 1119, in the same manner as in the procedure at operation 1109 as described above, the terminal may re-request the profile server to send an event to be performed next time in accordance with the "next events" list notified by the profile server at operation 1117. Regarding the detailed explanation of the TLS and secure connection and the user consent, explanation of the operation 1109 may be referred to. Further, if the event to be performed next time is the remote profile management event in accordance with the "next events" list, an identifier of the profile to be the subject of the corresponding event is not clear, and thus the terminal may set the event request type EventReqType to all events "ANY".

At operation 1121, the profile server may perform bundle transmission of other remote profile management events Enable ICCID2 and Disable ICCID1 together with the remote profile management event Update ICCID1 that is the event having the highest priority in the event storage according to the various embodiments of FIGS. 6A, 6B, 6C, 6D, 7A, 7B, 7C, 8, and 9 as described above. Further, since there is no event in a standby state in the event storage after the bundle transmission of the corresponding remote profile management events, the profile server may notify of "Nothing More" in the "next events" list. Notification of "Nothing More" in the "next events" list may be performed using a text as in this embodiment, using NULL data, using omission of the "next events" list itself, or using notification of the residual event "0" with respect to all event types.

At operation 1123, the terminal may successively process the received remote profile management events. Further, it could be easily understood that the subsequent procedure may be performed through repetition of the operations 1101 to 1123 as described above.

Figure 12:
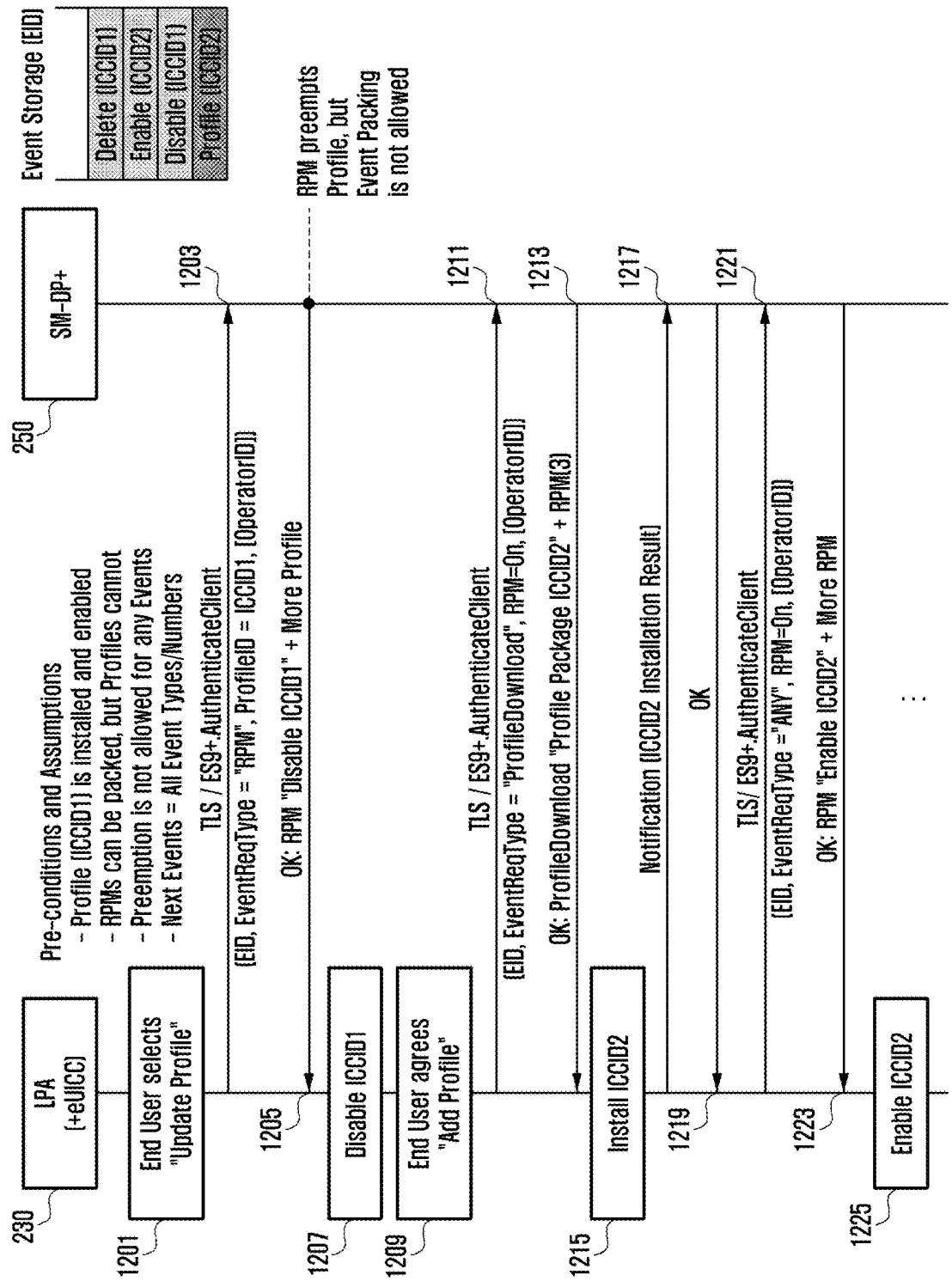

FIG. 12 is a diagram illustrating an example of a procedure in which the terminal 230 successively receives one or more events from the profile server 250 to perform the received events according to an embodiment of the present disclosure.

In this embodiment, it is assumed that a profile corresponding to an ICCID1 is installed/activated in the terminal, a remote profile management function of the terminal is activated (on), the event storage of the profile server is aligned in accordance with the order of event registration time, bundle transmission of any event is impossible, but if the terminal requests, only the remote profile management event can be transmitted more preferentially than the profile download event, and the "next events" are configured to describe only the event type of the event having the highest priority in the event storage.

Referring to FIG. 12, at operation 1201, the terminal may select a specific profile (in this embodiment, ICCID1) from the user, and may receive a command for "refresh profile".

At operation 1203, the terminal may perform TLS secure connection and mutual authentication procedure with the profile server, and may request a remote profile management event from the profile server to suit the user's request according to the embodiment of FIG. 4 as described above.

At operation 1205, the profile server may search for a profile download event that is an event having the highest priority in the event storage according to the embodiment of FIGS. 6A, 6B, 6C, 6D, 7A, 7B, 7C, 8, and 9 as described above, and since the corresponding event does not coincide with the event type (remote profile management) requested by the terminal, but the preferential transmission thereof, which deviates from the priority, is possible, the event having the highest priority (in this embodiment, update ICCID1) among the events that suit the event type (remote profile management) requested by the terminal in the event storage can be preferentially transmitted. Further, the profile server may notify the terminal that the profile download event that is the event having the highest priority in the event storage is in a standby state except for the corresponding event.

At operation 1207, the terminal may perform the received remote profile management event. Thereafter, if needed, report of the performance result of the remote profile management event may be omitted.

At operation 1209, the terminal may notify the user who has commanded the profile update that it is used to perform "add profile" after the profile update according to the received "next events" list, and may obtain the user's consent. If the user does not consent, the terminal may end the procedure without any additional operation.

At operation 1211, the terminal may re-request the profile server to send an event to be performed next time according to the "next events" list notified by the profile server at operation 1205. If one or more of the TLS secure connection and the mutual authentication procedure between the terminal and the profile server at operation 1203 during transmission of the re-request message have already been ended or a new event request message should be discriminated by a new transaction ID on the policy of the profile server, the terminal may perform new TLS secure connection and mutual authentication procedure with the profile server.

At operation 1213, the profile server may notify the terminal that two remote profile management events are in a standby state using the "next events" list together with the profile download event ICCID2 that is the event having the highest priority in the event storage according to the various embodiments of FIGS. 6A, 6B, 6C, 6D, 7A, 7B, 7C, 8, and 9 as described above. In this embodiment, it is illustrated that a profile package is instantly transmitted in response to the operation 1211. However, as exemplified in FIG. 2 as described above, profile metadata is preferentially transmitted at operation 211, a user consent to the profile installation is obtained again at operation 213, and a profile package is transmitted to the terminal in the case where the terminal requests the profile package from the profile server at operation 215. In this case, an additional user consent may be integrated with the user consent at operation 1209.

At operation 1215, the terminal may install a profile ICCID2 in accordance with the received profile download event (more specifically, profile package).

At operation 1217, the terminal may transmit the performance result of the profile download event that has been completed (i.e., profile installation result (ICCID2 installation result)) to the profile server.

At operation 1219, the profile server may notify the terminal that the event performance result has been successfully received. Further, although not illustrated in the drawing, at operation 1219, the profile server may repeat the "next events" list at operation 1113 in the same manner as in the embodiment of FIG. 10 as described above.

At operation 1221, in the same manner as in the procedure at operation 1211 as described above, the terminal may re-request the profile server to send an event to be performed next time in accordance with the "next events" list notified by the profile server at operations 1213 to 1219. Regarding the detailed explanation of the TLS and secure connection and the user consent, explanation of the operation 11211 may be referred to. Further, if the event to be performed next time is the remote profile management event in accordance with the "next events" list, an identifier of the profile to be the subject of the corresponding event is not clear, and thus the terminal may set the event request type EventReqType to all events "ANY".

At operation 1223, the profile server may notify the terminal that the remote profile management event is in a standby state suing the "next events" list together with the remote profile management event (enable ICCID2) that is the event having the highest priority in the event storage according to the various embodiments of FIGS. 6A, 6B, 6C, 6D, 7A, 7B, 7C, 8, and 9 as described above.

At operation 1225, the terminal may manage the profile (activate ICCID2) in accordance with the received remote profile management event. Further, the subsequent procedure may be performed through repetition of the operations 1201 to 1225 as described above.

Figure 13:
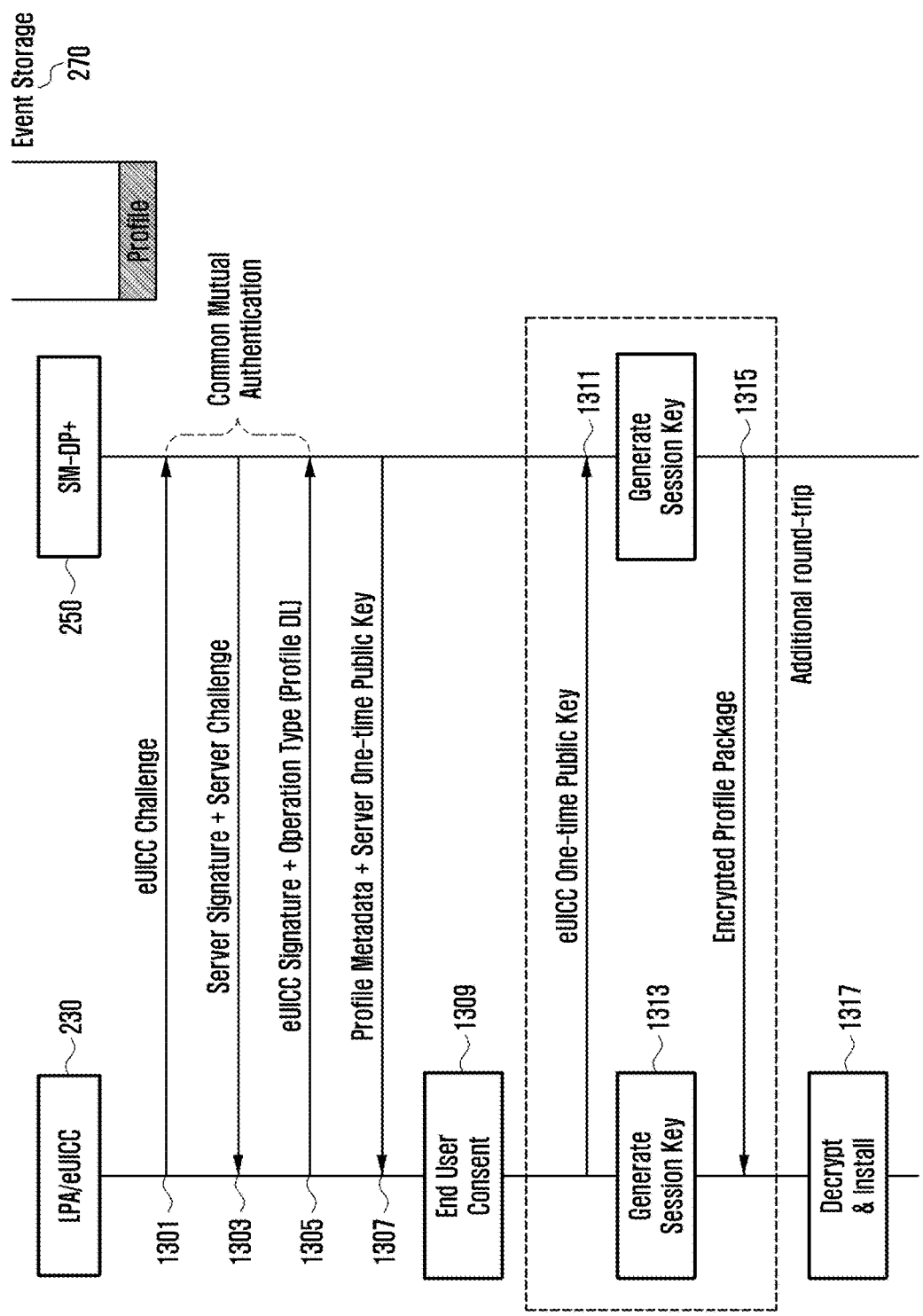
FIG. 13 is a diagram illustrating a procedure in which a terminal requests a "profile download" from a server and receives a response to the request according to an embodiment of the present disclosure.

FIG. 13 is a diagram illustrating a procedure in which a terminal 230 requests a "profile download" from a profile server 250 and receives a response to the request in the case of installing a profile through the profile server according to an embodiment of the present disclosure.

Referring to FIG. 13, at operation 1301, the terminal 230 may transmit a certain character string "Challenge" to the profile server 250. Communication at operation 1301 may be protected through HTTPS to TLS secure connections. At operation 1303, the profile server 250 may transmit to the terminal 230 a certain character string "Challenge" together with a signature of a server. At operation 1305, the terminal 230 may transmit a terminal authentication request message to the profile server 250. Specifically, the terminal 230 may transmit to the profile server 250 information on the type (OperationType) of a specific event requested together with the signature of the terminal 230 using the terminal authentication request message. In this embodiment, explanation will be made with respect to a case where a profile is in a standby state in the event storage 270 of the profile server and the terminal requests profile download (Profile DL). At the operations 1303 to 1305, the message exchange procedure between the terminal 230 and the profile server 250 may be called a mutual authentication procedure. At operation 1307, the profile server 250 may transmit a terminal authentication response message to the terminal 230. Specifically, as requested by the terminal 230 at operation 1305, the profile server 250 may send to the terminal 230 the terminal authentication response message including profile metadata and a one-time public key as preparation for the profile download. The profile metadata may include information on the name of a service provider, a logo set by the service provider, and a charging system. At operation 1309, the terminal 230 may receive an input of an end user consent to the profile installation based on the profile metadata received at operation 1307. If the user consents to this, the terminal, at operation 1311, may send the one-time public key to the profile server 250. At operation 1313, the terminal 230 and the profile server 250 may generate a session key through combination of a one-time public key mutually exchanged at operations 1307 to 1311 with a one-time private key corresponding to the public key. At operation

1315, the profile server 250 may send a profile package encrypted using the session key generated at operation 1313 to the terminal 230 in reply. Thereafter, at operation 1317, the terminal 230 may decrypt and install the encrypted profile package.

As compared with a remote profile management procedure to be described later, the profile download procedure, as described above at operations 1311 to 1315, additionally utilizes one message exchange between the terminal 230 and the profile server 250 in order to receive the profile package used for actual profile installation.

Figure 14:
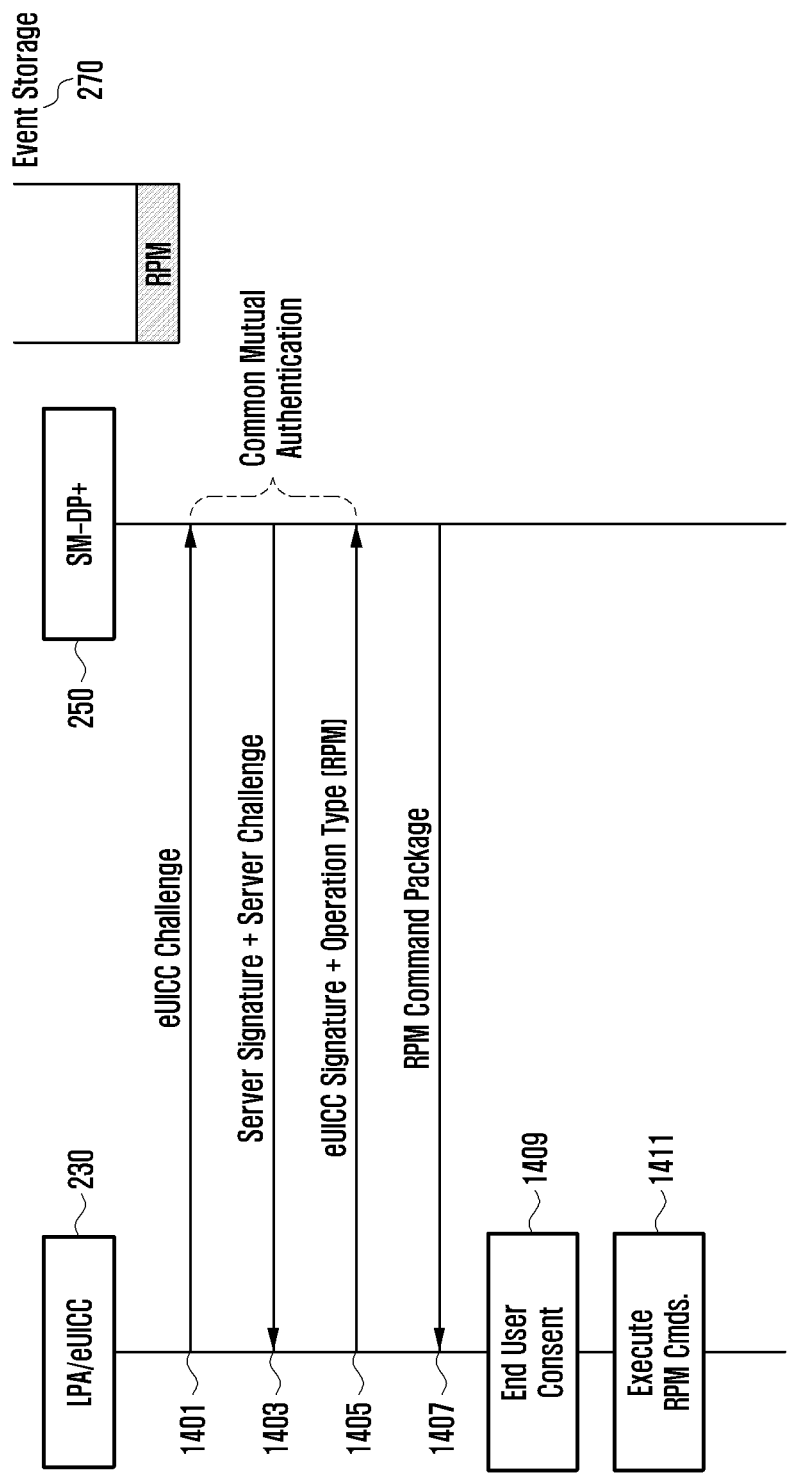
FIG. 14 is a diagram illustrating a procedure in which a terminal requests a "remote profile management" from a server and receives a response to the request according to an embodiment of the present disclosure.

FIG. 14 is a diagram illustrating a procedure in which a terminal 230 requests a "remote profile management" from a profile server 250 and receives a response to the request in the case of performing the remote management through the profile server according to an embodiment of the present disclosure.

Referring to FIG. 14, at operation 1401, the terminal 230 may transmit a certain character string "Challenge" to the profile server 250. Communication at operation 1401 may be protected through HTTPS to TLS secure connections. At operation 1403, the profile server 250 may transmit to the terminal 230 a certain character string "Challenge" together with the signature of the server. At operation 1405, the terminal 230 may request from the profile server 250 the type (OperationType) of a specific event together with the signature of the terminal. In this embodiment, explanation will be made with respect to a case where a remote management command is in a standby state in the event storage 270 of the profile server and the terminal 230 requests RPM. At the operations 1403 to 1405, the message exchange procedure between the terminal 230 and the profile server 250 may be called a mutual authentication procedure. At operation 1407, the profile server 250 may transmit to the terminal 230 a package (RPM command package) including a remote profile management command as requested at operation 1405. At operation 1409, the terminal 230 may receive an input of an end user consent to the profile management based on the remote profile management received at operation 1407. If the user consents to this, the terminal 230, at operation 1411, may perform a remote profile management command.

In the remote profile management procedure, the terminal 230 can receive all remote profile management commands at operation 1407, and as compared with the profile download procedure as described above with reference to FIG. 13, one message exchange between the terminal 230 and the profile server 250 corresponding to operations 1311 to 1315 of FIG. 13 is not additionally required.

Figure 15:
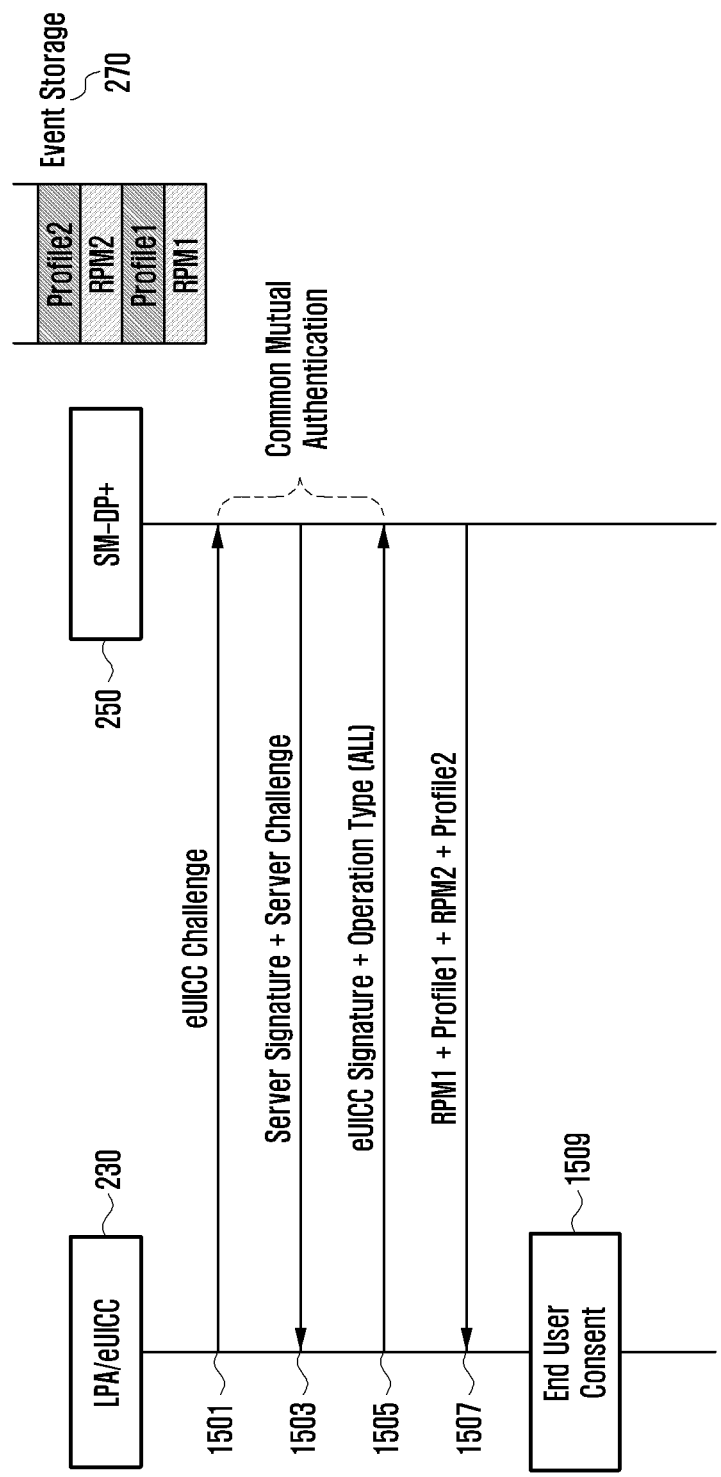
FIG. 15 is a diagram illustrating a procedure in which a terminal requests all types of events from a server and receives a response to the request according to an embodiment of the present disclosure.

FIG. 15 is a diagram illustrating a procedure in which a terminal 230 requests all types of events from a profile server 250 and receives a response to the request in the case of installing two profiles through the profile server and performing twice remote management according to an embodiment of the present disclosure.

Referring to FIG. 15, at operation 1501, the terminal 230 may transmit a certain character string "Challenge" to the profile server 250. Communication at operation 1501 may be protected through HTTPS to TLS secure connections. At operation 1503, the profile server 250 may transmit to the terminal 230 a certain character string "Challenge" together with the signature of the server. At operation 1505, the terminal 230 may request from the profile server 250 the type (OperationType) of a specific event together with the signature of the terminal. In this embodiment, explanation will be made with respect to a case where two remote management commands and two profiles are in a standby state in the event storage 270 of the profile server and the terminal 230 requests all types (ALL). At the operations 1503 to 1505, the message exchange procedure between the terminal 230 and the profile server 250 may be called a mutual authentication procedure. At operation 1507, the profile server 250 may simultaneously transmit remote profile management 1, profile metadata 1, remote profile management 2, and profile metadata 2 as requested by the terminal 230 at operation 1505. At operation 1509, the terminal 230 may receive an input of an end user consent to the profile management and installation based on the remote profile management through the profile metadata received at operation 1507.

After operation 1509, if the user consents, the terminal 230 may perform remote profile management and profile installation procedure. In this case, the remote profile management (remote profile management 1 and remote profile management 2) can be performed just after operation 1509, whereas the profile installation (profile metadata 1 and profile metadata 2) can be performed to secure a profile package by additionally performing one message exchange between the terminal 230 and the profile server 250 as described above at operations 1311 to 1355 of FIG. 13 for each profile installation. A detailed scheme for the terminal 230 to successively perform the remote profile management and the profile installation will be described in detail with reference to FIGS. 16 and 17.

In addition, respective profile metadata and remote profile management data at operation 1507 accompany the signature of the profile server 250 for the terminal 230 to verify data integrity. In this case, if the methods for generating the signature for the profile metadata and the signature for the remote profile management data (e.g., digital signature algorithm and digital certificate type for signature) are different from each other, the profile server 250 may support the terminal 230 to easily verify the signature and process the respective data through proper adjustment of signature generation and data deployment. A method for the profile server 250 to generate a digital signature and deploy data will be described in detail with reference to FIGS. 18 to 21.

Figure 16:
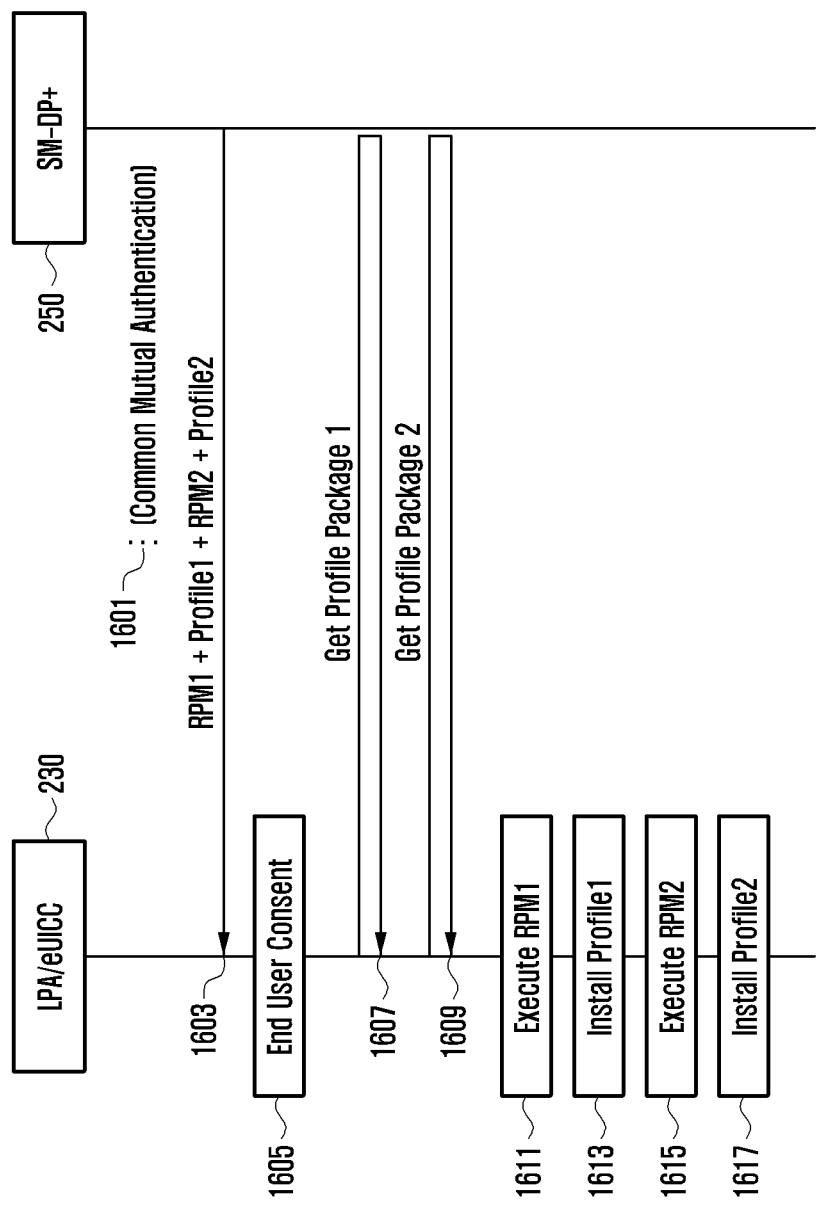
FIG. 16 is a diagram illustrating a method for a terminal to successively process events after preferentially securing data of all the events according to an embodiment of the present disclosure.

FIG. 16 is a diagram illustrating a method for a terminal 230 to successively process events after preferentially securing data for all events according to an embodiment of the present disclosure.

Referring to FIG. 16, at operation 1601, the terminal 230 and the profile server 250 may perform mutual authentication. Regarding the mutual authentication and an operation request message of the terminal 230, explanations at operations 1503 to 1506 of FIG. 15 may be referred to. At operation 1603, the profile server 250 may simultaneously transmit remote profile management 1, profile metadata 1, remote profile management 2, and profile metadata 2. At operation 1605, the terminal 230 may receive an input of an end user consent to the remote profile management and installation based on the remote profile management and the profile metadata received at operation 1603. If the user consents to this, the terminal 230, at operations 1607 to 1609, may request profile package 1 and profile package 2 corresponding to the profile metadata 1 and profile metadata 2, and may receive them from the profile server 250. Thereafter, in accordance with the data processing order specified by the profile server 250 at operation 1603, the terminal 230 may perform the remote profile management 1 at operation 1611, install the profile package 1 at operation 1613, perform the remote profile management 2 at operation 1615, and install the profile package 2 at operation 1617.

In the procedure as described above, the terminal 230, at operation 1607 to 1609, may collectively secure data (i.e., profile package for the profile installation) used to process all the types of events received at operation 1603, and may perform the remote profile management and profile installation in accordance with the data processing order specified by the profile server 250 at operation 1603.

Figure 17:
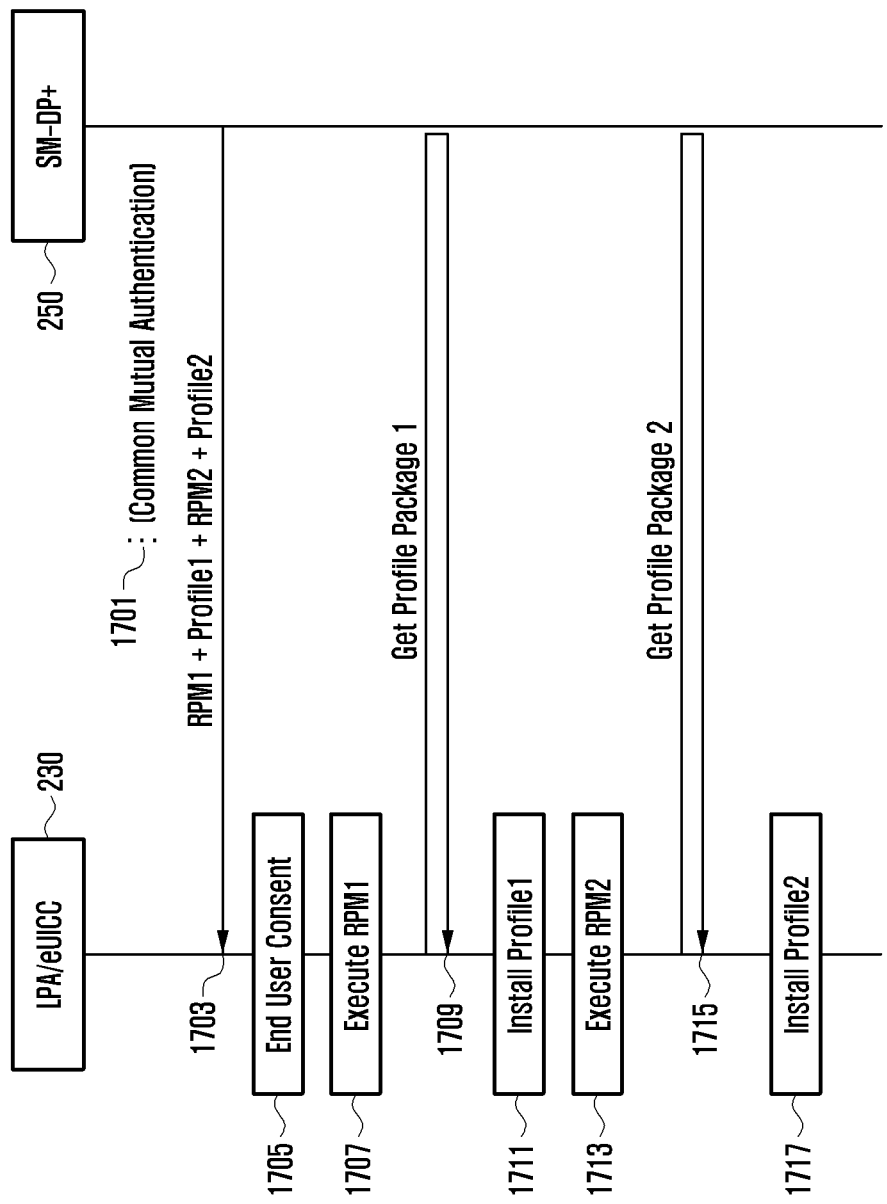
FIG. 17 is a diagram illustrating a method for a terminal to secure and process data of respective events in the order of event reception according to an embodiment of the present disclosure.

FIG. 17 is a diagram illustrating a method for a terminal 230 to secure and process data of respective events in the order of event reception according to an embodiment of the present disclosure.

Referring to FIG. 17, at operation 1701, the terminal 230 and the profile server 250 may perform mutual authentication. Regarding the mutual authentication and an operation request message of the terminal 230, explanations at operations 1503 to 1506 of FIG. 15 may be referred to. At operation 1703, the profile server 250 may simultaneously transmit remote profile management 1, profile metadata 1, remote profile management 2, and profile metadata 2. At operation 1705, the terminal 230 may receive an input of an end user consent to the remote profile management and installation based on the remote profile management and the profile metadata received at operation 1703. If the user consents to this, the terminal 230, at operations 1707, may perform the remote profile management 1 in accordance with the data processing order specified by the profile server 250 at operation 1703, receive profile package 1 corresponding to the profile metadata 1 at operation 1709, install the profile package 1 at operation 1711, perform the remote profile management 2 at operation 1713, receive profile package 2 corresponding to the profile metadata 2 at operation 1715, and install the profile package 2 at operation 1717.

In the above-described procedure, with respect to the all types of events received at operation 1703, the terminal 230 may preferentially perform the remote profile management without securing additional data, and if needed, it may perform the profile installation through additional securing of the profile package from the profile server 250 as at operation 1709 or 1715 in accordance with the data processing order specified by the profile server 250 at operation 1703.

Figure 18:
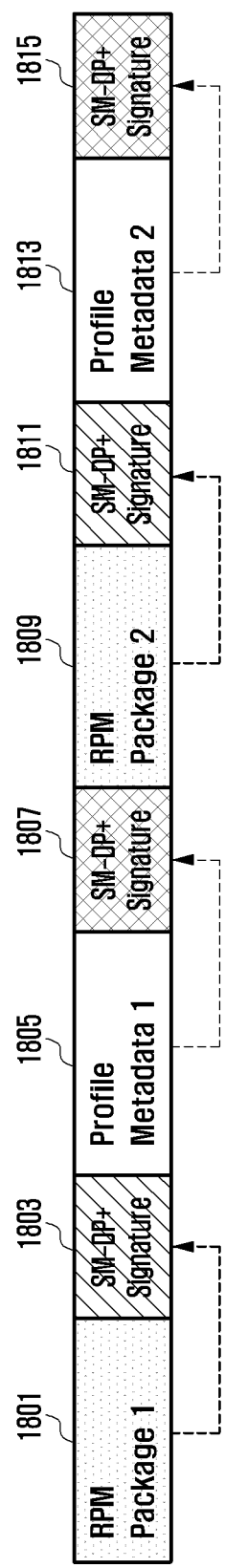
FIG. 18 is a diagram illustrating a method for a profile server to generate and attach a separate signature to respective remote profile management and profile metadata according to an embodiment of the present disclosure.

FIG. 18 is a diagram illustrating a method for a profile server 250 to generate and attach a separate signature to respective remote profile management and profile metadata when the profile server 250 transfers the remote profile management and profile metadata with respect to a message of the profile server 250 at operation 1603 of FIG. 16 to operation 1703 of FIG. 17 according to an embodiment of the present disclosure.

Referring to FIG. 18, the profile server 250 may generate digital signatures 1803 and 1811 with respect to remote profile management 1 data 1801 and remote profile management 2 data 1809. Further, the profile server 250 may generate digital signatures 1807 and 1815 with respect to profile metadata 1 data 1805 and profile metadata 2 data 1813. In this case, even if the profile server 250 does not specify the data processing order, the terminal 230 may process the data in the order of reception of the data from the profile server 250. In this embodiment, the terminal 230 may process the data in the order of the remote profile management 1, profile metadata 1, remote profile management 2, and profile metadata 2.

In the above-described configuration, each data is accompanied with a separately discriminated signature, and thus it is advantageous that the profile server 250 variously use algorithms and digital certificate types used to generate signatures for the respective data.

Figure 19:
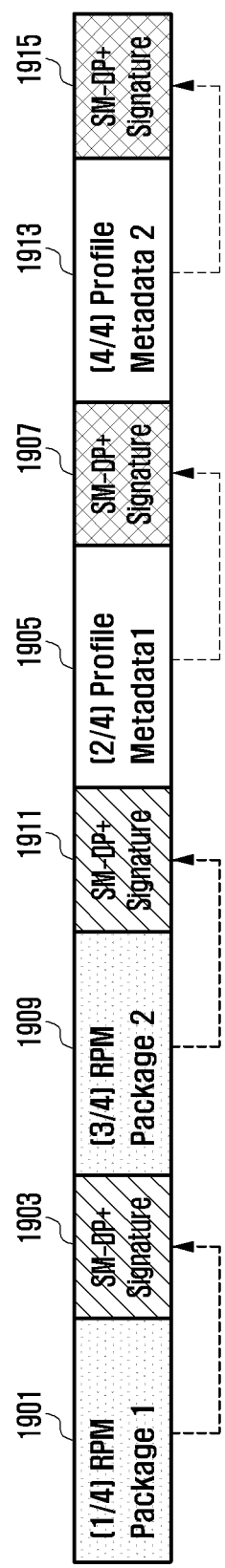
FIG. 19 is a diagram illustrating a method for a profile server to specify the order of data processing while generating and attaching a separate signature to respective remote profile management and profile metadata according to an embodiment of the present disclosure.

FIG. 19 is a diagram illustrating a method for a profile server 250 to generate and attach a separate signature to respective remote profile management and profile metadata and to specify the data processing order when the profile server 250 transfers the remote profile management and profile metadata with respect to a message of the profile server 250 at operation 1603 of FIG. 16 to operation 1703 of FIG. 17 according to an embodiment of the present disclosure.

Referring to FIG. 19, the profile server 250 may generate digital signatures 1903 and 1911 with respect to remote profile management 1 data 1901 and remote profile management 2 data 1909. Further, the profile server 250 may generate digital signatures 1907 and 1915 with respect to profile metadata 1 data 1905 and profile metadata 2 data 1913. In addition, the profile server 250 may specify the data processing order. As an example, in this embodiment for transmitting four pieces of data, the profile server 250 may specify the processing order of the data in a manner that among the four pieces of data, remote profile management 1 data 1901 is specified as the first one (1/4), profile metadata 1 data 1905 is the second one (2/4), remote profile management 2 data 1909 is the third (3/4), and profile metadata 2 data 1913 is the fourth (4/4).

In the above-described configuration, each data is accompanied with a separately discriminated signature, and thus it is advantageous that the profile server 250 variously use algorithms and digital certificate types used to generate signatures for the respective data. Further, since each data separately specifies the processing order, it is advantageous that the profile server 250 can freely adjust the data transmission order. In this case, this embodiment in which the profile server 250 specifies the data processing order is not limited to FIG. 19, and the data processing order may be specified even in the embodiment of FIG. 18 in which data is processed in the order of their reception.

Figure 20:
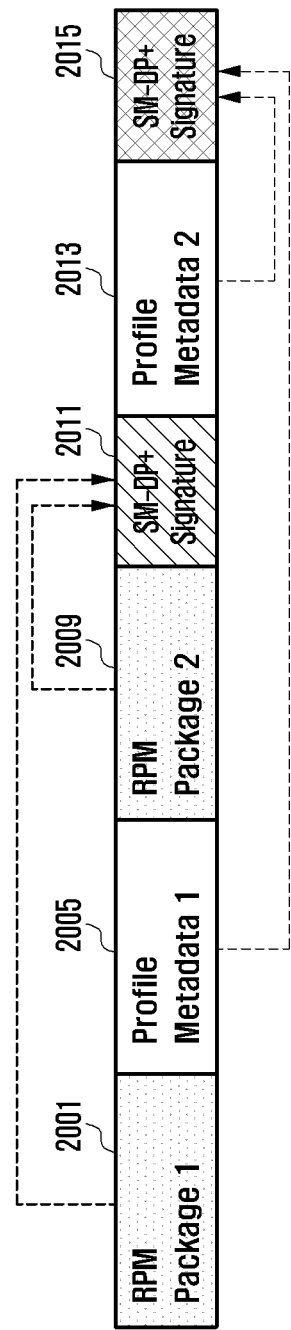
FIG. 20 is a diagram illustrating a method for a profile server to generate and attach a common signature to a part of respective remote profile management and profile metadata according to an embodiment of the present disclosure.

FIG. 20 is a diagram illustrating a method for a profile server 250 to generate and attach a common signature to a part of each remote profile management and profile metadata when the profile server 250 transfers the remote profile management and profile metadata with respect to a message of the profile server 250 at operation 1603 of FIG. 16 to operation 1703 of FIG. 17 according to an embodiment of the present disclosure.

Referring to FIG. 20, the profile server 250 may generate a digital signature (i.e., common signature) 2011 with respect to the whole of remote profile management 1 data 2001 and remote profile management 2 data 2009. Further, the profile server 250 may generate a digital signature (i.e., common signature) 2015 with respect to the whole of profile metadata 1 data 2005 and profile metadata 2 data 2013. In this case, even if the profile server 250 does not specify the data processing order, the terminal 230 may process the data in the order of reception of the data from the profile server 250. In this embodiment, the terminal 230 may process the data in the order of the remote profile management 1, profile metadata 1, remote profile management 2, and profile metadata 2.

In the above-described configuration, it is to be noted that data for which the profile server 250 generates the common signature is not limited to the same types of data. For example, although FIG. 20 illustrates a case where the common signatures are generated through separation of the remote profile management and profile metadata, the profile server 250 may generate the common signature with respect to the data for which the same signature generation method (i.e., signature generation algorithm and digital certificate) is used. In the above-described configuration, since the signature can be omitted with respect to the data sharing the signature, the amount of data transmitted from the profile server 250 to the terminal 230 can be reduced. In the configuration of FIG. 20, the terminal 230 separately gathers data becoming the subject of signature in order to verify the signature after receiving the whole data of the profile server 250. In this embodiment, in order to verify the signature 2011, the terminal 230 should selectively gather remote profile management 1 data 2001 firstly received and remote profile management 2 data 2009 thirdly received, and in order to verify the signature 2015, the terminal 230 should selectively gather profile metadata 1 data 2005 secondarily received and profile metadata 2 data 2013 fourthly received.

Figure 21:
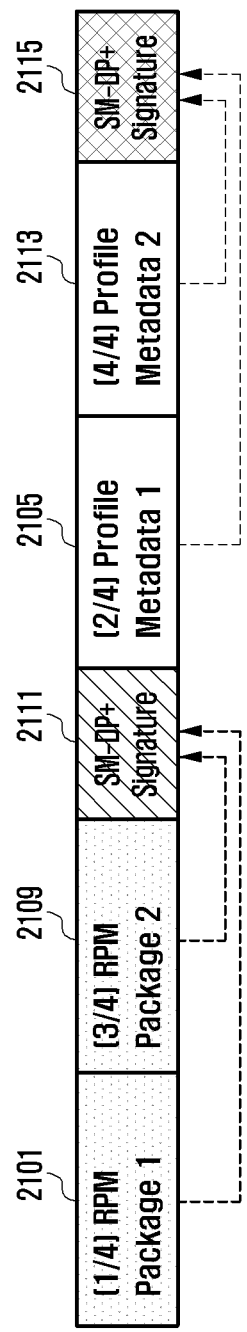
FIG. 21 is a diagram illustrating a method for a profile server to specify the order of data processing while generating and attaching a common signature to a part of respective remote profile management and profile metadata according to an embodiment of the present disclosure.

FIG. 21 is a diagram illustrating a method for a profile server 250 to generate and attach a common signature to a part of each remote profile management and profile metadata and to specify the data processing order when the profile server 250 transfers the remote profile management and profile metadata with respect to a message of the profile server 250 at operation 1603 of FIG. 16 to operation 1703 of FIG. 17 according to an embodiment of the present disclosure.

Referring to FIG. 21, the profile server 250 may generate a digital signature (i.e., common signature) 2111 with respect to the whole of remote profile management 1 data 2101 and remote profile management 2 data 2109. Further, the profile server 250 may generate a digital signature (i.e., common signature) 2115 with respect to the whole of profile metadata 1 data 2105 and profile metadata 2 data 2113. In addition, the profile server 250 may specify the data processing order. As an example, in this embodiment for transmitting four pieces of data, the profile server 250 may specify the processing order of the data in a manner that among the four pieces of data, remote profile management 1 data 2101 is specified as the first one (1/4), profile metadata 1 data 2105 is the second one (2/4), remote profile management 2 data 2109 is the third (3/4), and profile metadata 2 data 2113 is the fourth (4/4).

In the same manner as the case of FIG. 20, in the configuration of FIG. 21, it is to be noted that data for which the profile server 250 generates the common signature is not limited to the same types of data. In the above-described configuration, since the signature can be omitted with respect to the data sharing the signature, the amount of data transmitted from the profile server 250 to the terminal 230 can be reduced. Further, since the data separately specify the processing order, the profile server 250 has the advantage that it can freely adjust the data transmission order. For example, in order to remove a procedure in which the terminal 230 selectively gather data for signature verification in the embodiment of FIG. 20, the profile server 250 may deploy the remote profile management 1 data 2101 and the remote profile management 2 data 2109 that share the signature 2111 just before the signature 2111, and may deploy the profile metadata 1 data 2105 and the profile metadata 2 data 2113 that share the signature 2115 just before the signature 2115. In this case, the terminal 230 may process the data in the order of the remote profile management 1, profile metadata 1, remote profile management 2, and profile metadata 2, which is the data processing order specified by the profile server 250 after the authentication of the signatures 2111 and 2115.

It is to be noted that the signature generation and data deployment various embodiments of FIGS. 18 to 21 may be used in parallel to the procedures of FIGS. 16 and 17. In this case, the procedure of verifying the respective signatures of FIGS. 18 to 21 may be selectively performed at a time in the procedures of FIGS. 16 and 17. Parts of the detailed embodiments are as follows, but are not limited to the following embodiments. The verification procedure may be performed at a time when the signature verification is necessary.

Figure 22:
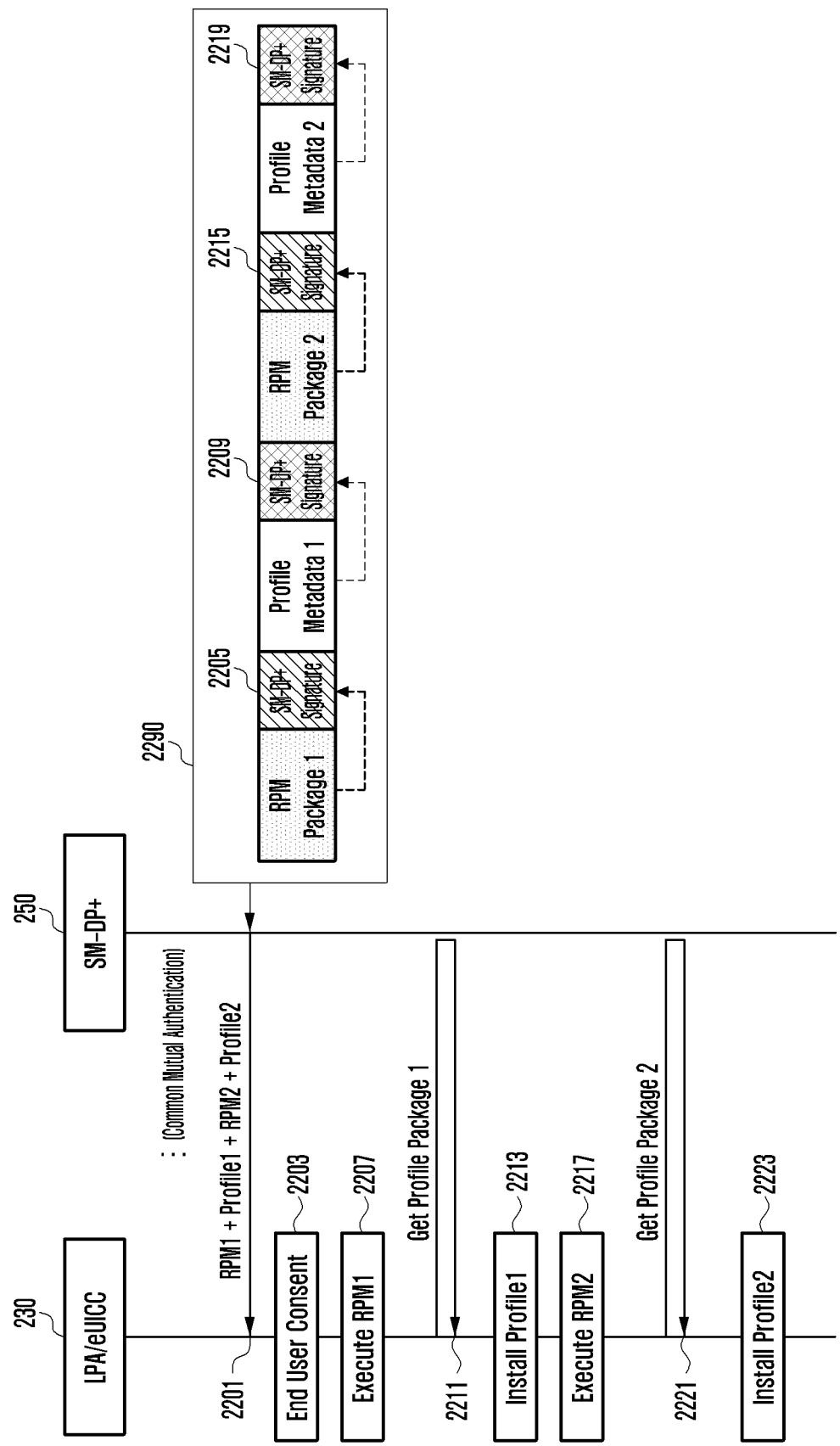
FIGS. 22 and 23 are diagrams illustrating a signature generation and data deployment method according to an embodiment of the present disclosure.

FIG. 22 is a diagram illustrating an embodiment in which the signature generation and data deployment method of FIG. 18 is used in the procedure of FIG. 17 according to an embodiment of the present disclosure.

In this case, explanation of the procedure as described above with reference to FIGS. 17 and 18 and the reference numerals will be omitted, and it is assumed that the terminal 230 receives a message of the type, such as 2290, from the profile server 250 at operation 2201. The terminal 230 may receive an end user consent at operation 2203, verify a signature at operation 2205, perform remote profile management 1 at operation 2207, verify a signature at operation 2209, receive profile package 1 corresponding to profile metadata 1 at operation 2211, install the profile package 1 at operation 2213, verify a signature at operation 2215, perform remote profile management 2 at operation 2217, verify a signature at operation 2219, receive profile package 2 corresponding to profile metadata 2 at operation 2221, and install the profile package 2 at operation 2223.

Figure 23:
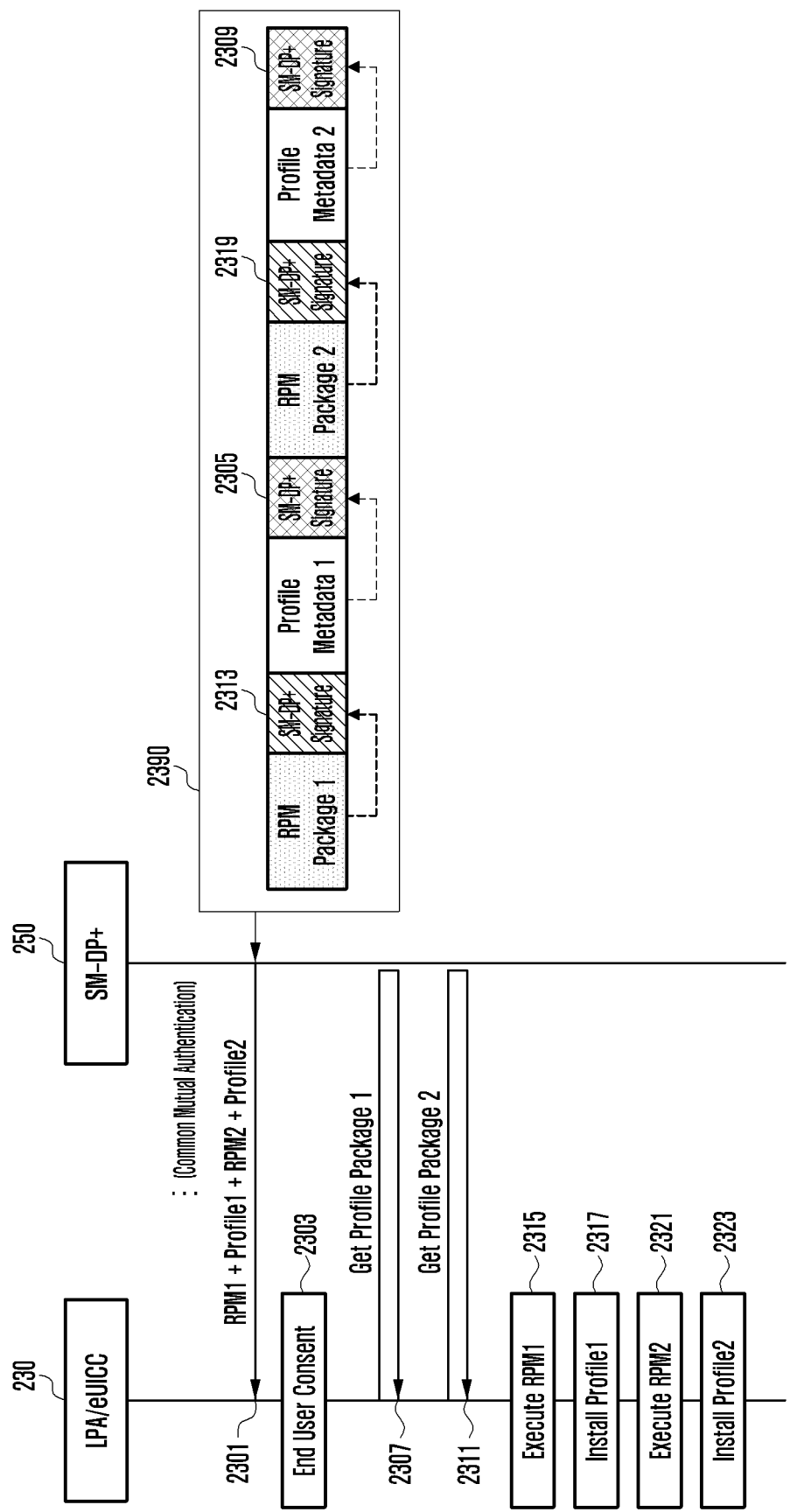

FIG. 23 is a diagram illustrating another embodiment in which the signature generation and data deployment method of FIG. 18 is used in the procedure of FIG. 16 according to an embodiment of the present disclosure.

In this case, explanation of the procedure as described above with reference to FIGS. 16 and 18 and the reference numerals will be omitted, and it is assumed that the terminal 230 receives a message of the type, such as 2390, from the profile server 250 at operation 2301. The terminal 230 may receive an end user consent at operation 2303, verify a signature at operation 2305, receive profile package 1 corresponding to profile metadata 1 at operation 2307, verify a signature at operation 2309, receive profile package 2 corresponding to profile metadata 2 at operation 2311, verify a signature at operation 2313, perform remote profile management 1 at operation 2315, verify a signature at operation 2313, perform remote profile management 1 at operation 2315, install profile package 1 at operation 2317, verify a signature at operation 2319, perform remote profile management 2 at operation 2321, and install profile package 2 at operation 2323.

As described above, since verification of the signature for the data received by the terminal 230 may be performed by the terminal 230 at a time after the data is received, it may be performed before the procedure of receiving an input of the end user consent. As an example, although not separately illustrated, in the case of using the signature generation and data deployment method of FIG. 21 in the procedure of FIG. 16, the terminal 230 may verify signatures 2111 and 2115 of FIG. 21 after operation 1603 of FIG. 16, and may perform operation 1605 of FIG. 16 and the subsequent operations.

As another example, although not separately illustrated, in the case of using the signature generation and data deployment method of FIG. 19 in the procedure of FIG. 17, the terminal 230 may verify a signature 1903 of FIG. 19, perform operation 1707 of FIG. 17, verify a signature 1907 of FIG. 19, perform operations 1709 to 1711 of FIG. 17, verify a signature 1911 of FIG. 17, perform operation of 1713 of FIG. 17, verify a signature 815 of FIG. 19, and perform operations 1715 to 1717 of FIG. 17.

FIGS. 24A, 24B, 25, and 26 illustrate various embodiments of a method for a terminal 230 to configure a user interface (UI) to receive an input of an end user consent at operation 1605 or 1705 in the procedure of FIGS. 16 and 17 according to an embodiment of the present disclosure.

Figure 27:
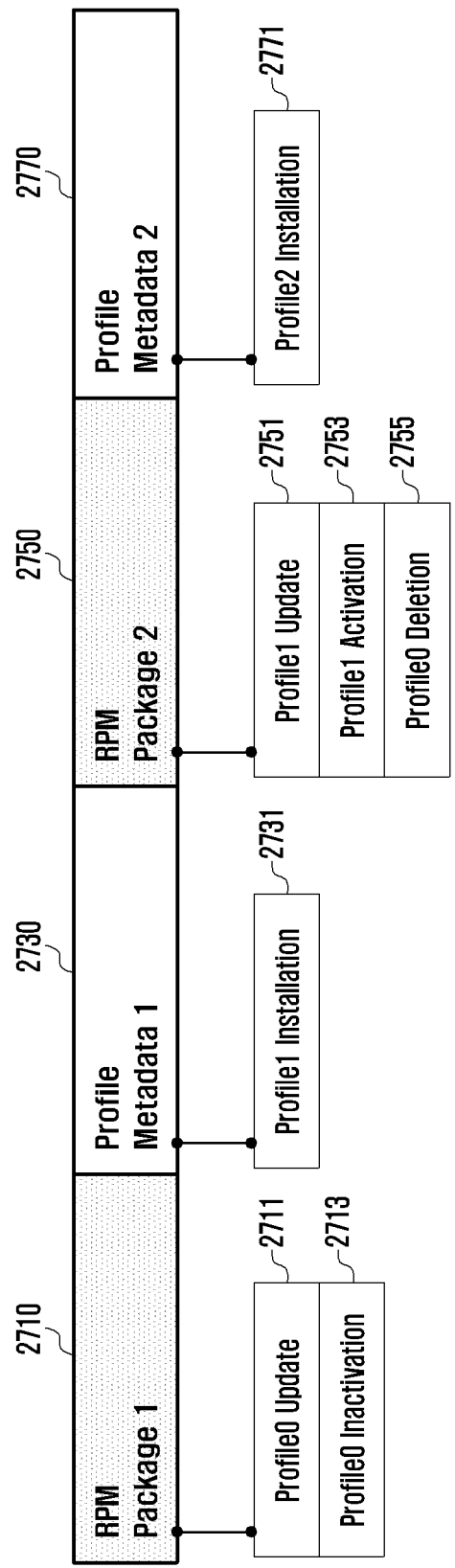
FIG. 27 is a diagram illustrating the operation of a terminal in accordance with a time series flow according to an embodiment of the present disclosure.

FIG. 27 is a diagram illustrating the operation of a terminal in accordance with a time series flow according to an embodiment of the present disclosure.

Referring to FIGS. 24A, 24B, 25, and 26, it is assumed that data of remote profile management1 2710, profile metadata1 2730, remote profile management2 2750, and profile metadata2 2770 as illustrated in FIG. 27 is received. It is also assumed that profile0 is installed and activated in the terminal 230, the remote profile management1 2710 includes remote commands of profile0 update 2711 and profile0 inactivation 2713, the profile metadata1 2730 includes data for profile1 installation 2731, the remote profile management2 2750 includes remote commands of profile1 update 2751, profile1 activation 2753, and profile0 deletion 2755, and the profile metadata2 2770 includes data for profile2 installation 2771.

Figure 24A:
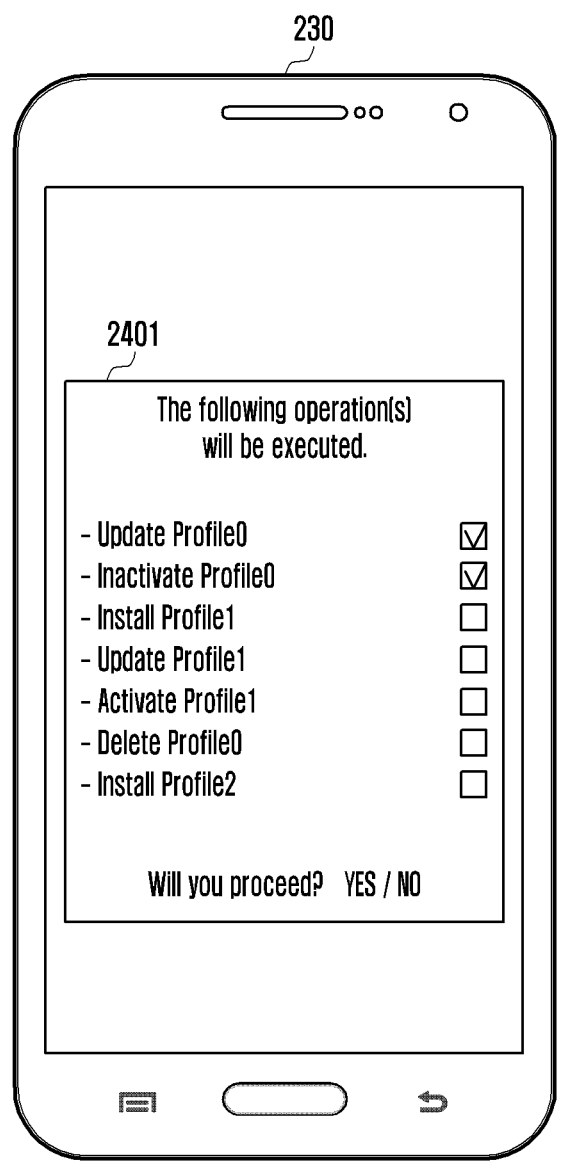
FIGS. 24A, 24B, 25, and 26 are diagrams illustrating a method for configuring a user interface (UI) in a terminal according to an embodiment of the present disclosure.
Figure 24B:
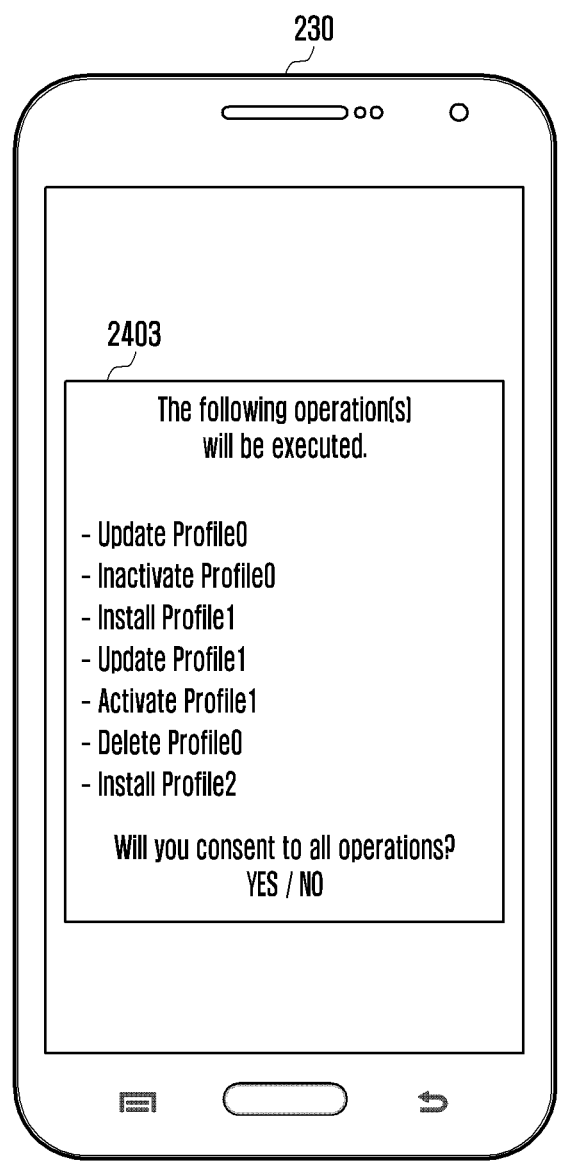

Referring to FIGS. 24A and 24B, if the terminal 230 receives data as in FIG. 27, it may output a user interface in the form as indicated by 2401 of FIG. 24A or 2403 of FIG. 24B to the user. In messages 2401 and 2403, the terminal 230 may obtain a user consent by successively outputting all procedures included in the data of FIG. 27. The order of outputting the respective procedures may follow the order in which the terminal receives the respective procedures or the order in which the terminal 230 will process the respective procedures. The consent to the respective procedures may employ individual user's checking as indicated by 2401, or user's consent for integrating the whole as indicated by 2403. Further, although not separately illustrated in FIGS. 24A and 24B, the terminal 230 may additionally display a service provider's name, logo, and service fees with respect to the profile that is the subject of the respective procedures, or may additionally output a user interface for receiving an input of a separate password or personal identification number (PIN) set by the user or the service provider.

Figure 25:
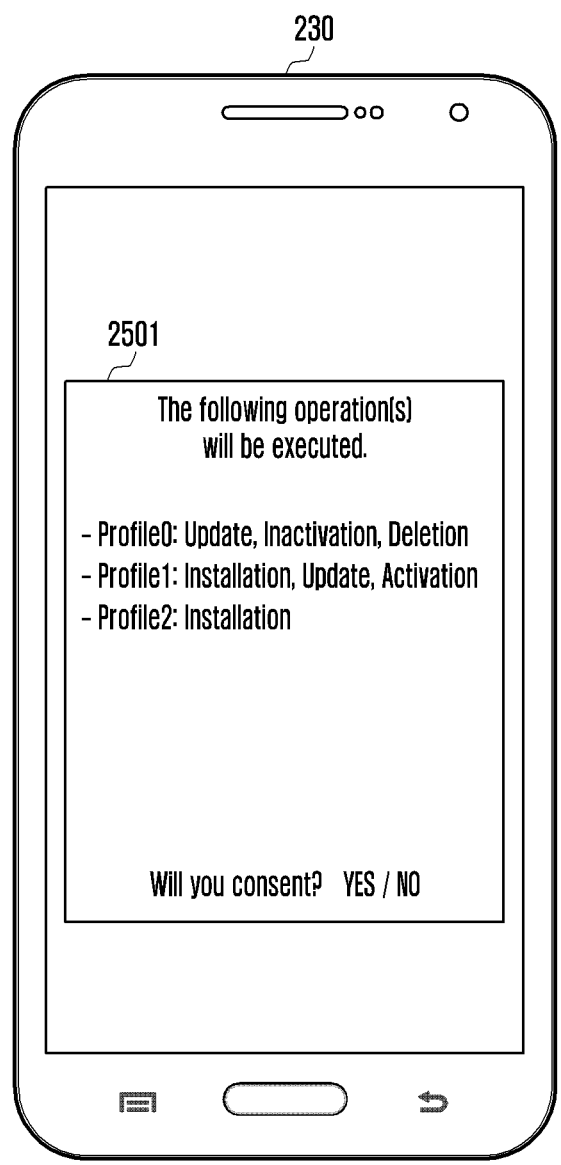

Referring to FIG. 25, if the terminal 230 receives data as in FIG. 27, it may output a user interface in the form as indicated by 2501 to the user. In a message 2501, the terminal 230 may obtain a user consent by classifying the procedures included in the data of FIG. 27 by profiles that are the subject of the respective procedures to obtain a user consent. Further, although not separately illustrated in FIG. 25, in the same manner as the message 1301 of FIGS. 24A and 24B, the terminal 230 may request individual user consent to sets of procedures classified by profiles. Further, although not separately illustrated in FIG. 25, the terminal may additionally display a service provider's name, logo, and service fees with respect to the profile that is the subject of the respective procedures, or may additionally output a user interface for receiving an input of a separate password or PIN set by the user or the service provider.

Figure 26:
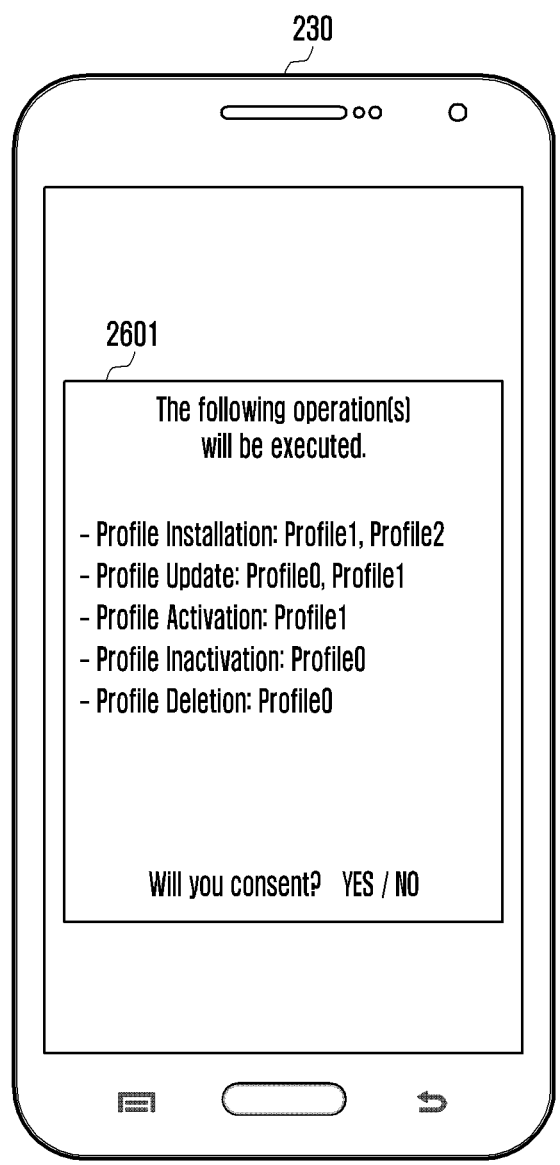

Referring to FIG. 26, if the terminal 230 receives data as in FIG. 27, it may output a user interface in the form as indicated by 2601 to the user. In a message 2601, the terminal 230 may obtain a user consent by classifying and outputting the procedures included in the data of FIG. 27 by types of the respective procedures to obtain a user consent. Further, although not separately illustrated in FIG. 26, in the same manner as the message 2401 of FIGS. 24A and 24B, the terminal 230 may request individual user consent to sets of procedures classified by types. Further, although not separately illustrated in FIG. 26, the terminal may addition- ally display a service provider's name, logo, and service fees with respect to the profile that is the subject of the respective procedures, or may additionally output a user interface for receiving an input of a separate password or PIN set by the user or the service provider.

It is to be noted that the user interfaces corresponding to FIGS. 24A, 24B, 25, and 26 may be applied to all embodiments to which FIGS. 16 and 17 are applied as described above. Accordingly, the user interfaces corresponding to FIGS. 24A, 24B, 25, and 26 can be applied even to the procedures of receiving the user consent at operations 2203 or 2303 in the various embodiments of FIGS. 22 and 23.

Figure 28:
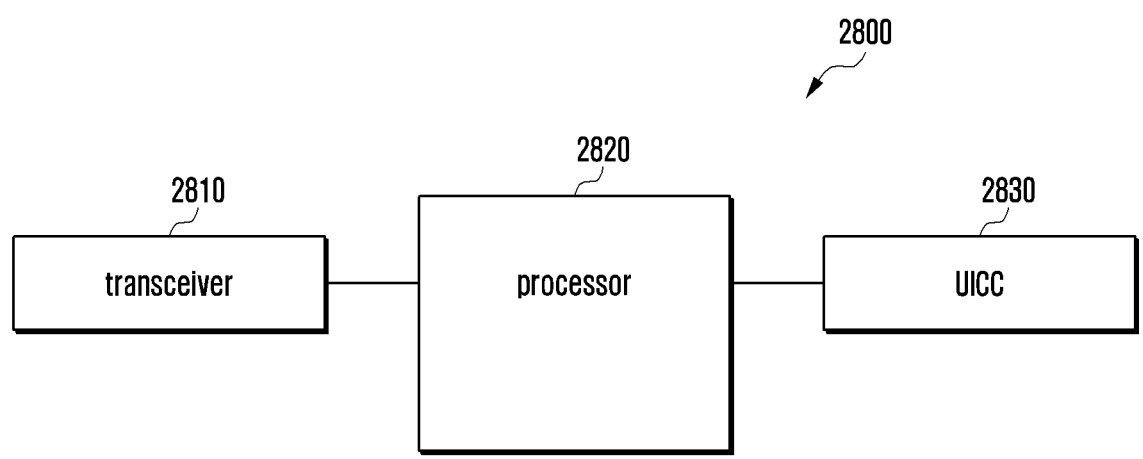
FIG. 28 is a block diagram illustrating constituent elements of a terminal according to an embodiment of the present disclosure.

FIG. 28 is a diagram illustrating the configuration of a terminal according to an embodiment of the present disclosure.

Referring to FIG. 28, a terminal 2800 may include a transceiver 2810 and a processor 2820. Further, the terminal 2800 may include a UICC 2830. The UICC 2830 may be inserted into the terminal 2800, or may be embedded in the terminal 2800.

The transceiver 2810 may transmit and receive signals, information, and data.

On the other hand, the processor 2820 may control the overall operation of the terminal 2800. According to an embodiment of the present disclosure as described above, the processor 2820 may control the overall operation of the terminal 2800.

Further, the UICC 2830 may download a profile and install the downloaded profile. In addition, the UICC 2830 may manage the profile. The UICC 2830 may operate under the control of the processor 2820. Further, the UICC 2830 may include a processor or a processor for installing the profile, or an application may be installed therein.

Figure 29:
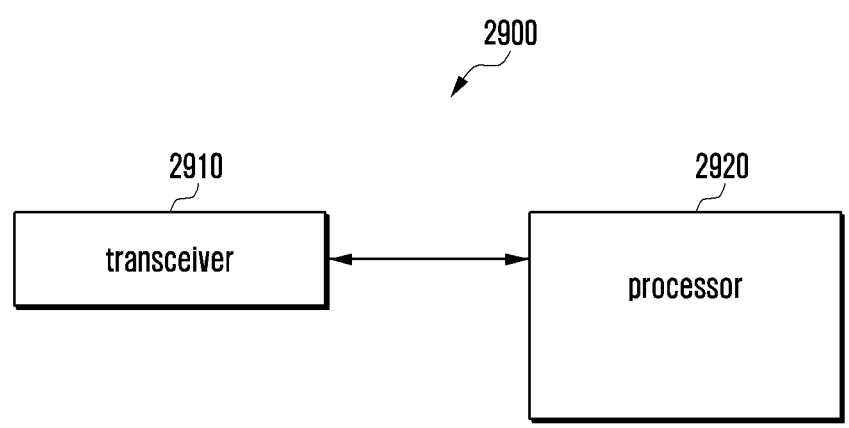
FIG. 29 is a block diagram illustrating constituent elements of a server according to an embodiment of the present disclosure.

FIG. 29 is a diagram illustrating constituent elements of a server 2900 according to an embodiment of the present disclosure. For example, the server 2900 may be a profile server.

The server 2900 may include a transceiver 2910 and a processor 2920.

The transceiver 2910 may transmit and receive signals, information, and data. For example, the transceiver 2910 may transmit a profile to the terminal.

On the other hand, the processor 2920 is a constituent element for controlling the overall operation of the server 2900. According to an embodiment of the present disclosure as described above, the processor 2920 may control the overall operation of the server 2900.

In the detailed embodiments of the present disclosure as described above, constituent elements included in the present disclosure are expressed in a singular form or in a plural form in accordance with the proposed detailed embodiments. However, the singular or plural expression is selected to suit the proposed situation for convenience in explanation, and the present disclosure is not limited to singular or plural constituent elements. Even the constituent elements in a plural expression may be expressed in a singular form, and even the constituent elements in a singular expression may be expressed in a plural form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for receiving profile related information by a terminal in a wireless communication system, the method comprising:

transmitting, to a server, a first message to request a first event for the terminal, wherein the first message includes information indicating a first operation type of the first event, the first operation type being a download of a profile;

receiving, from the server, a first response message including data associated with the profile based on the first operation type and a signature of the server for the data;

transmitting, to the server, a second message to request a second event for the terminal, wherein the second message includes information indicating a second operation type of the second event, the second operation type being a remote profile management (RPM) for the profile; and receiving, from the server, a second response message including an RPM package associated with the profile based on the second operation type, the RPM package including a plurality of RPM commands for the profile and a signature of the server for the plurality of RPM commands, wherein, in case that more than one RPMs are pending in the server, a priority of the more than one RPMs for the second response message is determined by a request of an operator.

2. The method of claim 1, wherein the first message and the second message correspond to an authenticate client request message and include a signature of a universal integrated circuit card (UICC) of the terminal.

3. The method of claim 1,
wherein, in case that more than one profile downloads are pending in the server, a priority of the more than one profile downloads for the first response message is determined by a request of the operator.

4. The method of claim 1, further comprising:
installing the profile based on the first response message;
receiving an user input for executing the plurality of RPM commands included in the RPM package, the user input being a combined input for the RPM package; and
performing an operation corresponding to the plurality of RPM commands for the profile based on the user input.

5. A terminal for receiving profile related information in a wireless communication system, the terminal comprising:
a transceiver; and
a controller coupled with the transceiver and configured to:
transmit, to a server, a first message to request a first event for the terminal, wherein the first message includes information indicating a first operation type of the first event, the first operation type being a download of a profile,
receive, from the server, a first response message including data associated with the profile based on the first operation type and a signature of the server for the data,
transmit, to the server, a second message to request a second event for the terminal, wherein the second message includes information indicating a second operation type of the second event, the second operation type being a remote profile management (RPM) for the profile, and
receive, from the server, a second response message including an RPM package associated with the profile based on the second operation type, the RPM package including a plurality of RPM commands for the profile and a signature of the server for the plurality of RPM commands, wherein, in case that more than one RPMs are pending in the server, a priority of the more than one RPMs for the second response message is determined by a request of an operator.

6. The terminal of claim 5, wherein the first message and the second message correspond to an authenticate client request message and include a signature of a universal integrated circuit card (UICC) of the terminal.

7. The terminal of claim 5,
wherein, in case that more than one profile downloads are pending in the server, a priority of the more than one profile downloads for the first response message is determined by a request of the operator.

8. The terminal of claim 5, wherein the controller is further configured to:
install the profile based on the first response message,
receive an user input for executing the plurality of RPM commands included in the RPM package, the user input being a combined input for the RPM package, and
perform an operation corresponding to the plurality of RPM commands for the profile based on the user input.

9. A method for transmitting profile related information by a server in a wireless communication system, the method comprising:
receiving, from a terminal, a first message to request a first event for the terminal, wherein the first message includes information indicating a first operation type of the first event, the first operation type being a download of a profile;
transmitting, to the terminal, a first response message including data associated with the profile based on the first operation type and a signature of the server for the data;
receiving, from the terminal, a second message to request a second event for the terminal, wherein the second message includes information indicating a second operation type of the second event, the second operation type being a remote profile management (RPM) for the profile; and
transmitting, to the terminal, a second response message including an RPM package associated with the profile based on the second operation type, the RPM package including a plurality of RPM commands for the profile and a signature of the server for the plurality of RPM commands, wherein, in case that more than one RPMs are pending in the server, a priority of the more than one RPMs for the second response message is determined by a request of an operator.

10. The method of claim 9, wherein the first message and the second message correspond to an authenticate client request message and include a signature of a universal integrated circuit card (UICC) of the terminal.

11. The method of claim 9,
wherein, in case that more than one profile downloads are pending in the server, a priority of the more than one profile downloads for the first response message is determined by a request of the operator.

12. The method of claim 9,
wherein the profile is installed in the terminal based on the first response message, and
wherein an operation corresponding to the plurality of RPM commands for the profile is performed based on a user input for executing the plurality of RPM commands, the user input being a combined input for the RPM package.

13. A server for transmitting profile related information in a wireless communication system, the server comprising:
a transceiver; and
a controller coupled with the transceiver and configured to:
receive, from a terminal, a first message to request a first event for the terminal, wherein the first message includes information indicating a first operation type of the first event, the first operation type being a download of a profile,
transmit, to the terminal, a first response message including data associated with the profile based on the first operation type and a signature of the server for the data,
receive, from the terminal, a second message to request a second event for the terminal, wherein the second message includes information indicating a second operation type of the second event, the second operation type being a remote profile management (RPM) for the profile, and
transmit, to the terminal, a second response message including an RPM package associated with the profile based on the second operation type, the RPM package including a plurality of RPM commands for the profile and a signature of the server for the plurality of RPM commands,
wherein, in case that more than one RPMs are pending in the server, a priority of the more than one RPMs for the second response message is determined by a request of an operator.

14. The server of claim 13, wherein the first message and the second message correspond to an authenticate client request message and include a signature of a universal integrated circuit card (UICC) of the terminal.

15. The server of claim 13,
wherein, in case that more than one profile downloads are pending in the server, a priority of the more than one profile downloads for the first response message is determined by a request of the operator.

16. The server of claim 13,
wherein the profile is installed in the terminal based on the first response message, and
wherein an operation corresponding to the plurality of RPM commands for the profile is performed based on a user input for executing the plurality of RPM commands, the user input being a combined input for the RPM package.

* * * * *